(12) United States Patent
Chyun

(10) Patent No.: US 7,401,436 B2
(45) Date of Patent: Jul. 22, 2008

(54) FLYING INSECT CAPTURE AND MONITORING SYSTEM

(75) Inventor: Chan H. Chyun, Songpa-gu (KR)

(73) Assignee: Cesco Co., Ltd., Seoul (KR)

( * ) Notice: Subject to any disclaimer, the term of this patent is extended or adjusted under 35 U.S.C. 154(b) by 0 days.

(21) Appl. No.: 10/590,837

(22) PCT Filed: Feb. 28, 2005

(86) PCT No.: PCT/KR2005/000560

§ 371 (c)(1),
(2), (4) Date: Aug. 24, 2006

(87) PCT Pub. No.: WO2005/082139

PCT Pub. Date: Sep. 9, 2005

(65) Prior Publication Data

US 2007/0169401 A1      Jul. 26, 2007

(30) Foreign Application Priority Data

Feb. 28, 2004    (KR) .................... 10-2004-0013761

(51) Int. Cl.
*A01M 1/04*   (2006.01)

(52) U.S. Cl. .......................................... 43/113; 43/114
(58) Field of Classification Search ................... 43/113, 43/114, 115, 116
See application file for complete search history.

(56) References Cited

U.S. PATENT DOCUMENTS

| | | | |
|---|---|---|---|
| 4,700,506 A | 10/1987 | Williams | |
| 5,505,017 A | 4/1996 | Nelson et al. | |
| 5,628,142 A * | 5/1997 | Kitterman et al. | 43/114 |
| 5,634,292 A * | 6/1997 | Kitterman | 43/115 |
| 5,651,211 A * | 7/1997 | Regan et al. | 43/113 |
| 6,161,327 A | 12/2000 | Thomas | |
| 6,289,629 B2 * | 9/2001 | Greening | 43/113 |
| 6,502,347 B1 * | 1/2003 | Carver, Sr. | 43/113 |
| 2001/0042337 A1 | 11/2001 | Lambert et al. | |
| 2002/0032980 A1 | 3/2002 | Nelson | |
| 2002/0078620 A1 * | 6/2002 | Nelson et al. | 43/113 |
| 2005/0155277 A1 * | 7/2005 | Bagnall et al. | 43/113 |

* cited by examiner

*Primary Examiner*—Kurt Rowan
(74) *Attorney, Agent, or Firm*—Marshall, Gerstein & Borun LLP

(57) ABSTRACT

There is provided a capturing apparatus for capturing flying insects, comprising: a UV lamp; a birdlime cartridge; a birdlime configured to be wound to the birdlime cartridge; and a means for winding the birdlime at a variable speed.

7 Claims, 18 Drawing Sheets

310, 320, 330
300
110

350
360   360'

| Apparatus | Number of insects | Grades |
|---|---|---|
| Capturing apparatus 1 | 2 | L1 |
| Capturing apparatus 2 | 0 | - |
| Capturing apparatus 3 | 3 | L1 |
| Capturing apparatus 4 | 0 | - |
| Capturing apparatus 5 | 0 | - |
| Capturing apparatus 6 | 0 | - |
| Capturing apparatus 7 | 8 | L2 |
| Capturing apparatus 8 | 1 | L1 |
| Capturing apparatus 9 | 0 | - |
| Capturing apparatus 10 | 0 | - |

Fig. 15

| Insect name | | Table 1 | Table 1 | Table 1 | | Table 1 | Table 1 | Table 1 | | Table 1 | Table 1 | Table 1 |
|---|---|---|---|---|---|---|---|---|---|---|---|---|
| | Alarm | L1 | L2 | L3 | Alarm | L1 | L2 | L3 | Alarm | L1 | L2 | L3 |
| Insect 1 | A | 1 | 1 | | A | 1 | | | B | 1 | | |
| | | 2 | 2 | | | 2 | | | C | 2 | 1 | 1 |
| | | 3 | | | B | 3 | 1 | | | | | |
| | | 4 | | | | 4 | | | | | | |
| | B | 5 | 3 | | C | 5 | 2 | 1 | | | | |
| | | 6 | 4 | | | | | | | | | |
| | | 7 | | | | | | | | | | |
| | | 8 | | | | | | | | | | |
| | | 9 | | | | | | | | | | |
| | C | 10 | | | | | | | | | | |

Fig. 16

| Sub-section code | Sub-section name | Insect |
|---|---|---|
| 110 | Outer blocks | Outer blocks | 1 |
| 200 | Restaurants | Dining Area | 1 |
| 240 | Kitchens | Kitchens | 1 |
| 300 | Halls | Halls | 2 |
| 400 | Building maintenance | Building maintenance facilities | 2 |
| 500 | Supplementary facilities | Supplementary facilities | 2 |
| 600 | Business attachments | Business attachments | 2 |
| 601 | Business attachments | Food stores | 2 |
| 602 | Business attachments | Shops | 2 |
| 701 | Medical facilitiess | Clinics | 3 |
| 702 | Medical facilities | Wards | 2 |
| 703 | Medical facilities | Emergency rooms | 3 |
| 704 | Medical facilities | Mortuaries | 2 |
| 705 | Medical facilities | Examination rooms | 3 |
| 800 | Production lines | Production lines(overall) | 2 |
| 901 | Common space | Offices | 3 |
| 902 | Common space | Lavatories | 1 |
| 903 | Common space | VIP rooms | 3 |
| 904 | Common space | Guest rooms | 3 |
| 905 | Common space | VIP rooms | 3 |
| 906 | Common space | General wards | 3 |
| 907 | Common space | Vending machines | 3 |
| 908 | Common space | Dormitory | 2 |
| 909 | Common space | Lodge | 2 |
| 910 | Common space | Shade houses | 2 |
| 911 | Common space | Pantries | 2 |
| 912 | Common space | Lobby | 2 |
| 999 | Etc. | Etc. | 2 |

Fig. 17

[DD/MM/YYYY] Insect related report

Number of pest in activity per each building [Period 1]

| Pest | Outer blocks | | | Warehouse | | Production building | | | |
|---|---|---|---|---|---|---|---|---|---|
| | Location1 | Location2 | Location3 | Location1 | Location2 | Production Dept. | Storage Dept. | Aging Dept. | Lavatory |
| Insect | | | | | | | | | |

Number of pest in activity per each building [Period 2]

| Pest | Outer blocks | | | Warehouse | | Production building | | | |
|---|---|---|---|---|---|---|---|---|---|
| | Location1 | Location2 | Location3 | Location1 | Location2 | Production Dept. | Storage Dept. | Aging Dept. | Lavatory |
| Insect | | | | | | | | | |

Number of pest in activity per each building [Period 3]

| Pest | Outer blocks | | | Warehouse | | Production building | | | |
|---|---|---|---|---|---|---|---|---|---|
| | Location1 | Location2 | Location3 | Location1 | Location2 | Production Dept. | Storage Dept. | Aging Dept. | Lavatory |
| Insect | | | | | | | | | |

| No. | Large section | Production building | Description of location | Sub-section code | Name and quantity of install equipment | Vulnerable section |
|---|---|---|---|---|---|---|
| | Floor/Middle section | Sub-section | | | | |
| | B1/Office | Customer center | | | | |
| | / | Education room | | | | |
| | /Warehouse | ACS warehouse | | | | |
| | / | Document warehouse | | | | |
| | Lobby | Lobby | | | | |
| | / | Lavatory | | | | |
| | 1st floor/ Production line 1 | Production Dept. | Next to elevator | 200 | A-2/3 | |
| | / | Storage Dept. | Next to Lavatory | 200 | A-2/2 | √ |
| | / | Aging Dept. | Opposite to elevator | 603 | C-2/4 | |
| | / | Lavatory | Left of staircase | 912 | C-1/4 | |
| | Rooftop/Rooftop | Rooftop | | | | |
| | / | Animal breeding room | | | | |

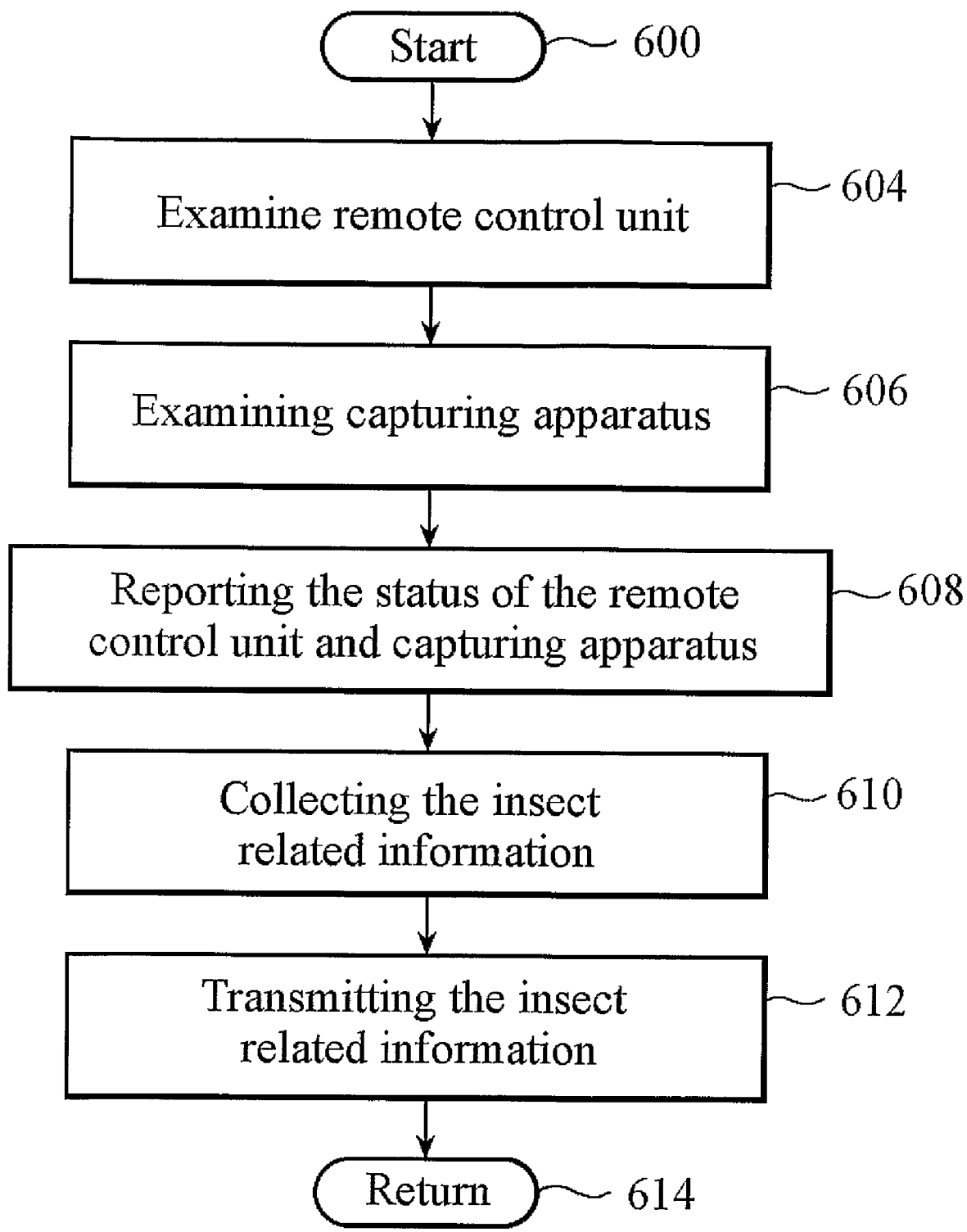

FLYING INSECT CAPTURE AND MONITORING SYSTEM

The present application claims the benefit of priority of International Patent Application No. PCT/KR2005/000560 filed on Feb. 28, 2005, which application claims priority of Korean Patent Application No. 10-2004-0013761 filed Feb. 28, 2004. The entire text of the priority application is incorporated herein by reference in its entirety.

TECHNICAL FIELD

The present invention generally relates to a capturing apparatus for capturing flying insects, and more particularly to a capturing apparatus with a new structure for capturing flying insects and an apparatus for determining the amount of the captured flying insects so as to utilize the information gathered thereby for insect control.

BACKGROUND ART

Conventionally, a capturing lamp has been widely used in order to capture flying insects such as mosquitoes and flies. The insects captured by the capturing lamp are killed using electricity or they become stuck on birdlime. Killing insects with electricity generates undesirable noises and produces unpleasant feelings to people nearby. Thus, people such as homeowners tend to move away from using electricity to kill insects. In case of using birdlime, the birdlime has to be regularly replaced with a new one. This is because the capacity of birdlime is limited and its adhesive strength becomes decreased due to dirt etc. Hence, even the insects attracted by the light apparatus may not stick to the birdlime. Of course, replacing the birdlime with a new one entails costs such as labor costs. Traditionally, a product using a very long birdlime of roll type, which is wound at a constant speed, had been used. According to this method, the labor cost associated with the above-described replacement may be mitigated because a roll of limed paper is used up before it is replaced. However, the birdlime became wound regardless of whether the flying insects were actually captured or not on the birdlime, thus resulting in unnecessary waste of the birdlime.

DISCLOSURE OF THE INVENTION

To address and resolve the above deficiencies of the prior art insect capturing apparatuses, the object of the present invention is to provide a flying insect capturing apparatus that is capable of monitoring the amount of captured flying insects.

More particularly, the present invention intends to provide a flying insect capturing apparatus with birdlime, which is capable of monitoring the amount of captured flying insects and which can adjust the winding speed of the birdlime depending on the above captured amount.

In addition, another object of the present invention is to provide an insect capturing apparatus where various insect attractors, as well as UV lamps, can be selectively used or at the same time.

Additionally, yet another object of the present invention is to provide an insect capturing apparatus, which is capable of providing a related control device with power or communication functions.

Also, still yet another object of the present invention is to provide a remote monitoring system to monitor the invasion state of flying insects and the status of the capturing apparatus in remote places.

In accordance with an embodiment of the present invention, there is provided a capturing apparatus for capturing flying insects, comprising: a UV lamp; a birdlime cartridge; a birdlime wound to the birdlime cartridge; and a means for winding the birdlime at a variable speed.

The speed of the winding means is determined depending on the amount of the captured flying insects on the birdlime.

The capturing apparatus may further comprise a means for determining the amount of flying insects captured on the birdlime, said determining means including a sensor for determining intensity.

Said capturing apparatus may further comprise a display means for displaying information related to the replacement timing of the birdlime.

Said capturing apparatus may further comprise a means for deciding the replacement timing of the birdlime, the means for deciding the replacement timing of the birdlime including a means for deciding the length of the wound birdlime or remaining birdlime.

Said capturing apparatus is enclosed by a cover, wherein a part of the cover is fabricated from a transparent material. The other part of the cover, which is directed downward when the capturing apparatus is installed, is fabricated from an opaque material.

BRIEF DESCRIPTION OF DRAWINGS

FIG. 15 is an alarm table used by insect control timing decision module to decide when to proceed with the insect control measures.

FIG. 16 is an application table for selecting a table depending on a sub-section code.

FIGS. 17 and 18 are diagrams showing reports prepared by a central control unit of the remote monitoring system in FIG. 9.

FIG. 19 is a flow chart showing major operations of a remote control unit in the remote monitoring system in FIG. 9.

BEST MODE FOR CARRYING OUT THE INVENTION

Figure 1:
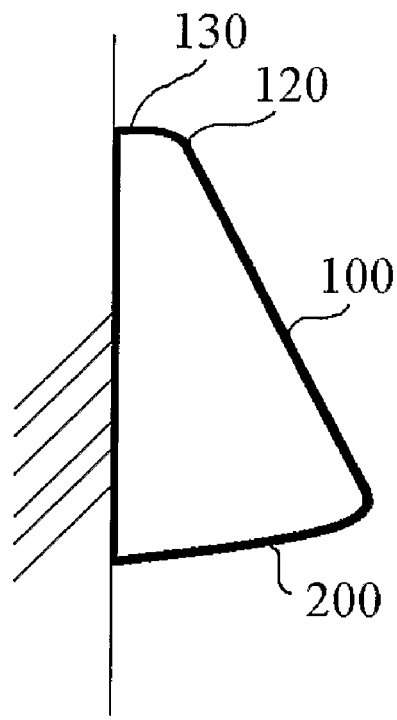
FIG. 1 is a vertical cross-sectional view of a cover for a capturing apparatus in accordance with an embodiment of the present invention.

The present invention includes an improved flying insect capturing apparatus, and a remote monitoring method and a system using the same. Detailed explanations of each embodiment will follow in view of the accompanying figures. In the drawings, each of the components will be referred to using their corresponding numerals.

Insect Capturing Apparatus

Figure 2:
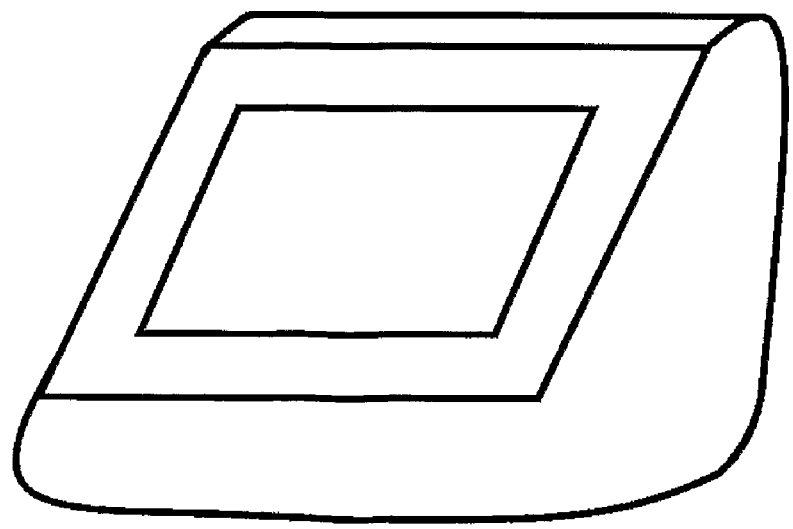
FIG. 2 is a perspective view of a capturing apparatus in accordance with an embodiment of the present invention.

FIG. 1 is a vertical sectional view of a cover part for an insect capturing apparatus (excluding an internal structure) constructed in accordance with a first embodiment of the present invention. FIG. 2 is a perspective view of the capturing apparatus. The capturing apparatus, which is constructed in accordance with a first embodiment of the present invention, has a shape of a generally rounded rectangle when viewed from the front (as shown in FIG. 2) and has a shape close to a trapezoid (which is cut in half) when viewed from the side. The overall shape of the capturing apparatus is not limited to such shapes, but may have other polygonal shapes or other various shapes. In addition, the shape and size of the insect capturing apparatus can vary depending on the type or size of other devices that are to be installed within the capturing apparatus.

The cover includes a cover top portion 130, a cover front surface 100, a cover bottom portion 200 and a cover back surface. The cover front surface 100 is a wide area, which can be seen externally, and performs a function of attracting flying insects by transmitting UV light from a capturing lamp (not shown) within the cover. The cover front surface 100 includes a plurality of openings 140 (not shown) through which flying insects may enter into the capturing apparatus. The cover front surface 100 is fabricated from a transparent material. Preferably, the cover front surface 100 has a degree of transparency and texture so as to spread the light broadly rather than transmitting the light directly. In one embodiment of the present invention, the cover front surface 100 may be fabricated from a semi-transparent material or a material in which the surface is treated to reflect light widely.

The cover bottom portion 200 may be integrally formed with the cover front surface 100. Alternatively, it may be formed separately and subsequently connected to the cover front surface 100. Preferably, the cover bottom portion 200 is fabricated from an opaque material to prevent the capturing light, such as UV, from reaching the human eyes in case the capturing apparatus is installed on an elevated position.

The cover top portion 130 is an upper part of the cover front surface 100 and may be integrally formed with the cover front surface 100. It is preferred that a portion of the cover is capable of being opened or detached to allow for the replacement and maintenance of devices installed inside the capturing apparatus of the present invention. For example, a portion of or the entire cover front surface 100 may be opened horizontally or vertically, or a portion of the cover surface may be disassembled and removed. It should be noted herein that other various modifications to the structure of the cover are possible.

The back of the cover may comprise a means for installing the capturing apparatus on the wall. For example, such means may be a hole through which a nail can be hammered into the wall. The back of the cover may be formed separately and then combined with other parts of the cover, or may be integrally formed with other parts of the cover.

Figure 3:
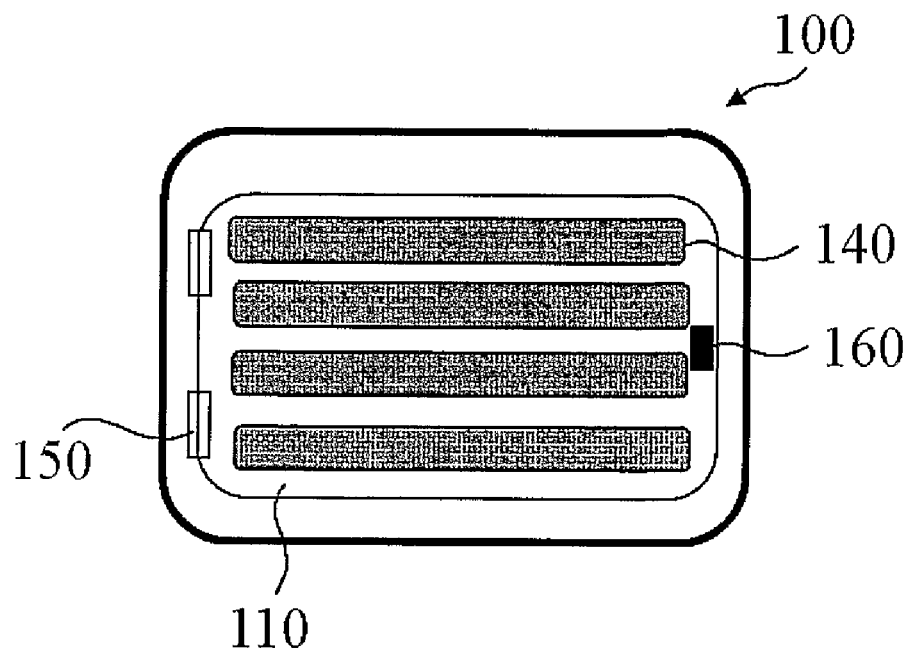
FIG. 3 is a front view of a cover for a capturing apparatus in accordance with an embodiment of the present invention.
Figure 4:
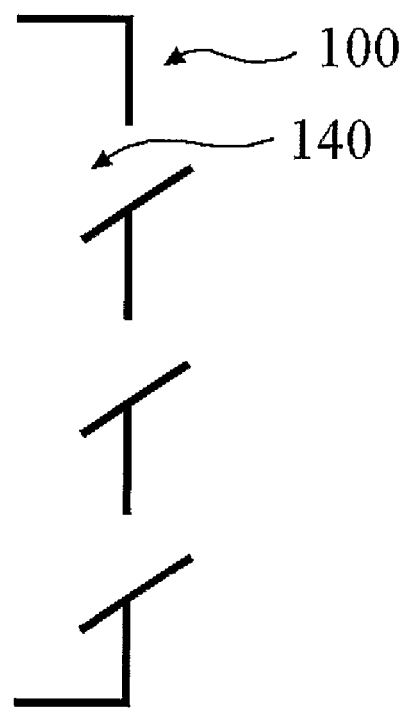
FIG. 4 is a sectional view of a front part of a cover in accordance with a second embodiment of the present invention.

FIG. 3 is a front view of the cover front surface 100 of the capturing apparatus. A plurality of openings, through which flying insects are attracted into the capturing apparatus, are formed on the cover front surface 100. The openings may be formed through simply perforating the cover front surface 100. A flap, which slants upward and outward, may be formed on the lower edge of the openings (as shown in FIG. 4). FIG. 4 is a vertical cross-sectional view of the cover front surface 100 comprising the flaps. The interior side of the flap is formed to be reflective so that phototactic flying insects can be effectively attracted.

Referring back to FIG. 3, a portion of the cover front surface 100 can be a capturing lamp installation part 110 where a capturing lamp is installed. Sockets 300 for capturing lamps and the capturing lamps 310, 320, 330 are installed on this portion, as described hereinafter in view of FIG. 6. An installation part 110 can be separately opened. The installation part 110 according to an embodiment of the present invention can be horizontally opened. The installation part 110 is connected to the cover front surface 100 by hinges 150 and has a fixing part 160 so as to be stably fitted with the cover front surface 100.

Figure 5:
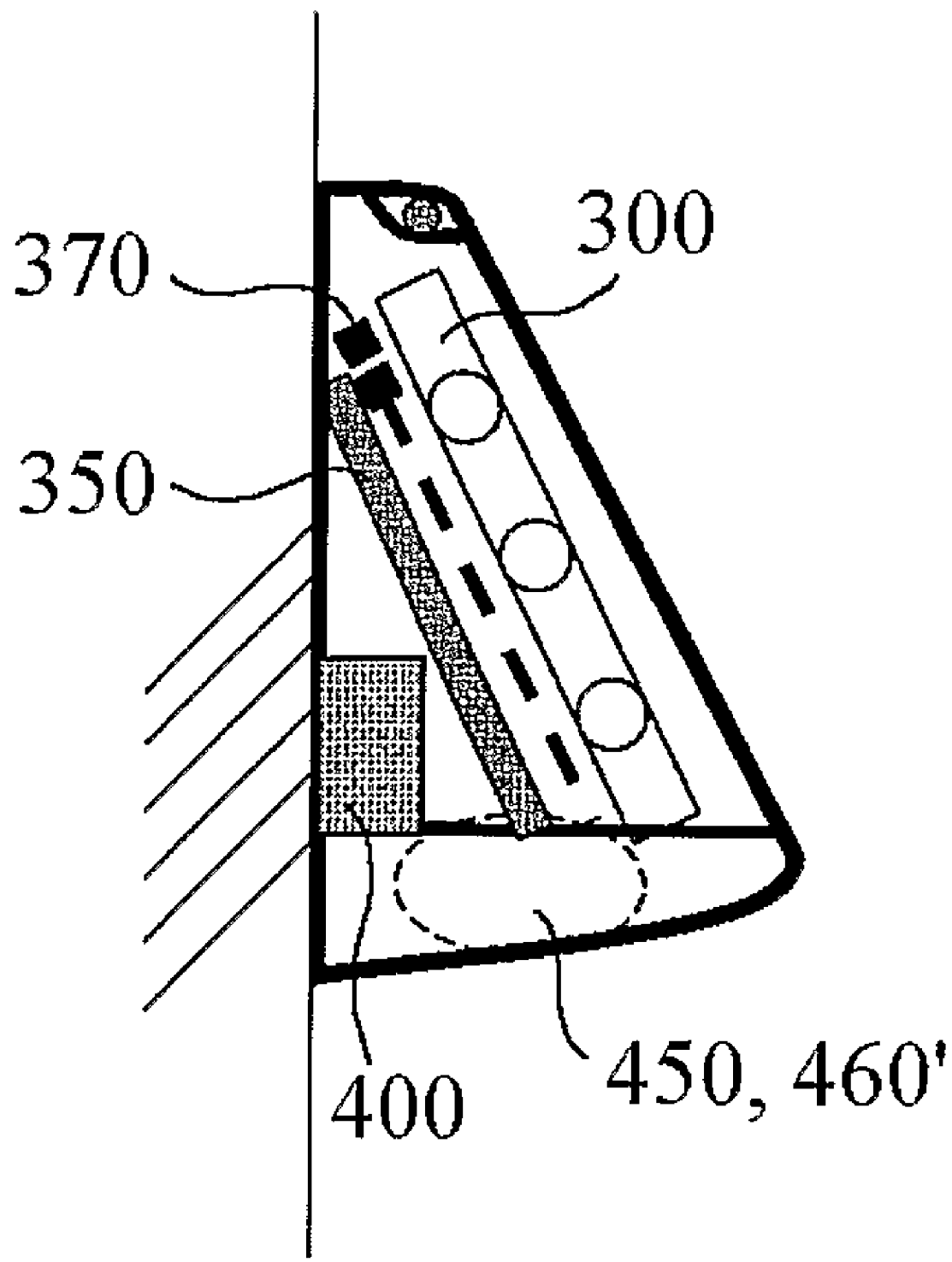
FIG. 5 is a vertical cross-sectional view of a capturing apparatus in accordance with an embodiment of the present invention.
Figure 6:
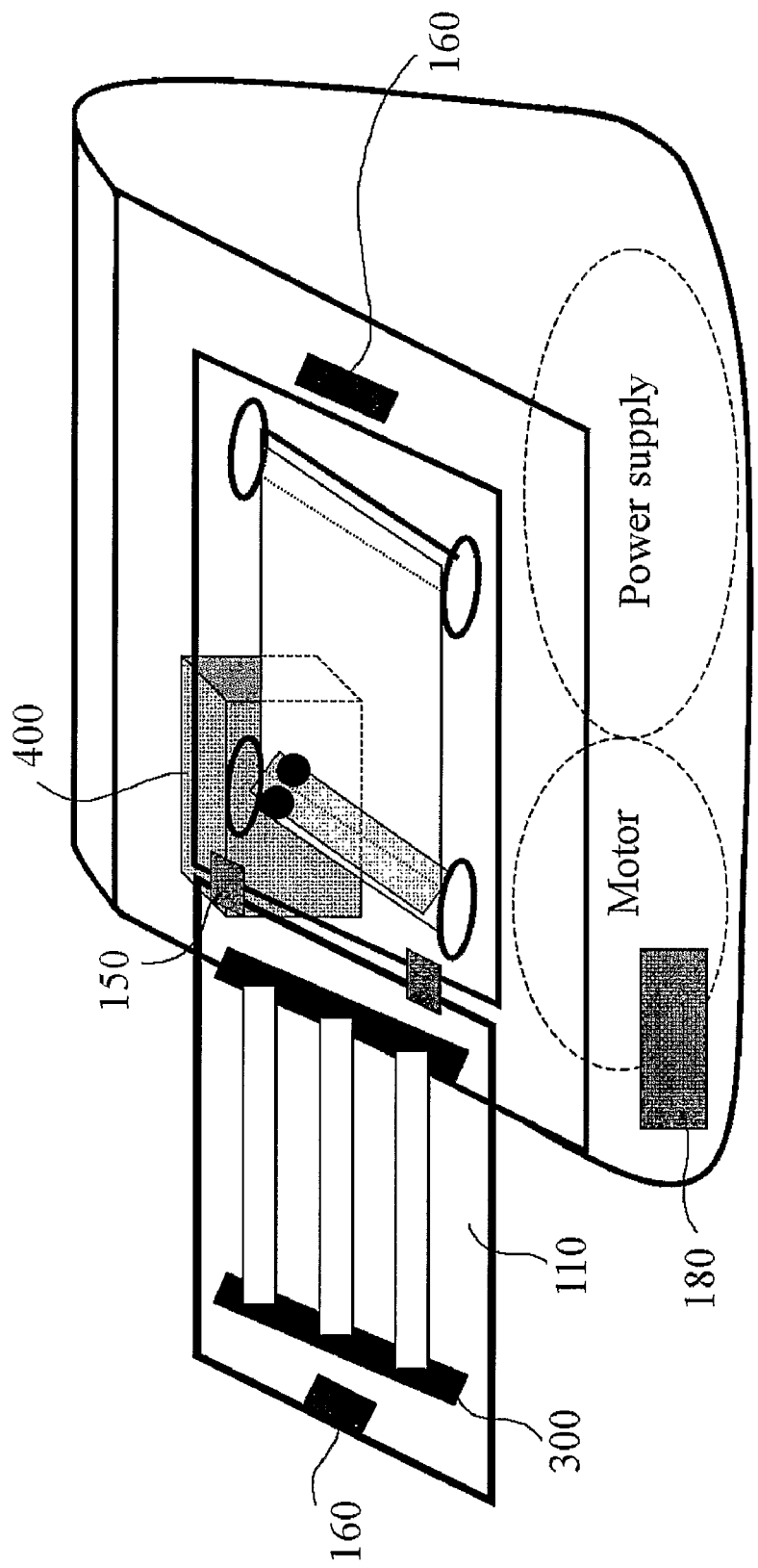
FIG. 6 is a perspective view of a capturing apparatus when a front part of the cover is open in accordance with an embodiment of the present invention.

FIG. 5 is a vertical cross-sectional view of the cover and the internal structure of a capturing apparatus of the present invention. FIG. 6 is a perspective view of a capturing apparatus of the present invention when a portion of the cover front surface is open. FIG. 6 schematically illustrates the devices installed within the capturing apparatus of the present invention.

In the capturing apparatus constructed in accordance with an embodiment of the present invention, three capturing lamps 310, 320, 330 are transversely placed in parallel. Further, the sockets 300 for fixing the capturing lamps are provided at both ends of the capturing lamp (see FIG. 6). A plurality of openings are formed on the portions between the capturing lamps and the upper or lower portions on the cover front surface 100, as described above (as shown in FIG. 3), so as to provide passages in which flying insects can pass through. Similar to the socket of the household fluorescent lamp, the socket 300 for the capturing lamp has a structure where the capturing lamp can fit into and is configured to supply electrical power to the both ends of the capturing apparatus. As shown in FIG. 5, the capturing lamps are located so as to be slanted along the slope of the cover (that is, to form an empty space inside and lower side of the capturing apparatus). The capturing lamps 310, 320, 330 and their sockets 300 are installed on the lamp installation part 110 of the cover front surface 100. Thus, they can be accessed only by opening the lamp installation part 110. By opening the lamp installation part 110, a service technician can have broad access to the other components inside the capturing apparatus as well as the capturing lamps. In an embodiment of the present invention, the lamp installation part 110 is pivotally fixed to the cover front surface 100 by using hinges 150 and the fixing part 160 is provided in the closing part.

Figure 7:
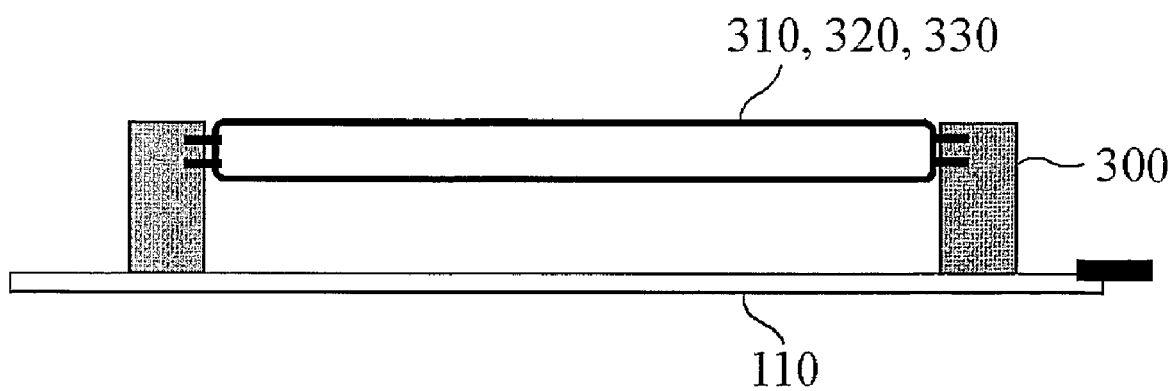
FIG. 7 is a horizontal cross-sectional view of a capturing lamp and an installation part thereof.

FIG. 7 is a horizontal cross-sectional view of the capturing lamps 310, 320, 330 and their sockets 300. The socket 300 is attached on the lamp installation part 110 of the cover front surface 100 and the capturing lamp is fit into a socket in a similar way to fitting the household fluorescent lamp. The capturing lamp is a UV lamp, which is known to effectively attract phototactic flying insects such as flies or moths. UVA lamp, which has the wavelength of 350 nm known to effectively attract insect, may be used. However, various other lamps, which are capable of attracting insects, may be used.

Figure 8:
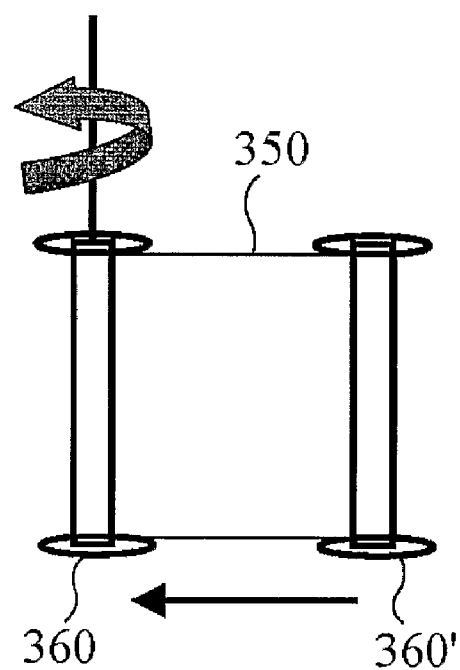
FIG. 8 is a schematic diagram of birdlime and a birdlime cartridge installed within a capturing apparatus in accordance with an embodiment of the present invention.

Referring back to FIGS. 5 and 6, the birdlime cartridges 360, 360' and the birdlime 350 are installed under the lamp in the capturing apparatus. The birdlime preferably has a planer shape with a similar width as the capturing lamp. Referring to FIG. 6, the birdlime is installed so as to form a vertical slant similar to the capturing lamp. The birdlime is manifoldly wound on the cartridges similar to a toilet roll. By slowly turning one of the two cartridges in one direction and having the other cartridge passively follow the first one, the birdlime may slowly be rolled (as shown in FIG. 8). The adhesive strength of the birdlime may be decreased if the flying insects attracted by the capturing lamp or other causes enter the capturing apparatus through the opening part 140 and are attached to the birdlime. As explained above, a new birdlime area is exposed by slowly turning the birdlime and thus the adhesive strength may be constantly maintained. The cartridge may be turned by a motor and the like. It may be turned fast if a large number of flying insects are caught on the birdlime. However, it may be slowly turned if a large number of flying insects are not caught on the birdlime. By adopting and implementing the above, a person does not need to change the birdlime even if flying insects are attached to the birdlime and it is sufficient to replace in a relatively large unit such as a cartridge. In addition, the cartridge is according to the amount of captured insects so that only the necessary birdlime is used, thus not resulting in any waste. The use of only the necessary amount saves the birdlime, while further saving labor expense for changing the birdlime since the cartridge of the birdlime is replaced less frequently.

The birdlime is made by coating an adhesive material on a plate, which is similar to a paper that can be rolled, wherein the plate is made of a material such as an aluminum foil so as to be reflective even after the adhesive material is coated thereon. The UV light illuminated from the capturing lamp to the back is also reflected from the birdlime plate and again illuminates the front. Thus, the attracting effect of the capturing lamp may be improved. In other embodiments, the same effect may be achieved by making the birdlime plate of transparent material and by placing a separate reflective plate at the rear of the birdlime. Based on the same principle, if the other parts of the capturing apparatus employ more reflective surfaces, the attractive force of the UV light may be increased.

In FIG. 6, the display 180 may be implemented with LED, LCD etc. and the driving circuit may be included within a controller 400. The display 180 may display, as needed, various information such as today's (or this month's) status of capturing insects, the environmental conditions such as the current temperature and humidity, and the remaining length of the birdlime (or whether the birdlime should be replaced or not).

According to an embodiment of the present invention, a sensor 370 is installed in order to detect the status of insects captured on the birdlime. The sensor 370 detects how many insects are attached to the birdlime, by, e.g., scanning one end of the birdlime surface and determining the intensity. That is, it perceives the light intensity difference between an area with insects attached thereon and an area with no insects attached thereon on the birdlime surface and determines how many insects are attached according to the intensity value. If many insects are attached to the surface, the rolling speed of the birdlime cartridge may become accelerated. Otherwise, the rolling speed of the birdlime cartridge may become decelerated. The sensor 370 may be a CCD device that can perform one-dimensional scan (one moving device may scan or an array of sensors can perform electronic scanning). Alternatively, it is possible to process images of the birdlime surface by mounting a camera or the like. Other types of devices that can detect light intensity may also be used. If a camera is used, it is possible to count the number of insects captured on the birdlime and to classify the insects by size through using a known image processing method. Also, it is possible to determine the type of the captured insects by deciding a certain reference pattern according to the size and the morphological features, in which the captured insects can then be compared to the reference pattern.

In addition, it is possible to determine the remaining length of the birdlime or the exchange timing by sensor 370. For example, by periodically making a predetermined pattern (e.g., a vertical line) on the birdlime at regular intervals and making a sensor 370 recognize this pattern, it is possible to approximately calculate the remaining length from the decided value in order to determine how many lines have passed after replacing the birdlime. Also, by making a predetermined pattern (e.g., two line pattern) at the place where the birdlime is nearly used up and decide that the replacement time has arrived when this pattern shows up, it is possible to know the exchange timing without making patterns on the entire surface. Alternatively, it is possible to determine the exchange timing by detecting an idle rolling of the cartridge when the cartridge is rotated with no remaining birdlime. By displaying information such as remaining length of the birdlime or the exchange timing on a display 180 as described above, a person who is in charge of the insect control can take measures (to replace the birdlime). Further, this information may be transmitted to the remote center or the remote person who is in charge of the insect control. This is so that the person can know the birdlime exchange timing and visit the site.

While it is preferable to relate the speed of winding the birdlime with the captured amount of insects, it is preferable to continuously wind the birdlime at a very slow rate, considering that the adhesive strength may be reduced by dust or the like even when the insects are not be captured. It has been illustrated that the speed of winding the birdlime is controlled in relation to the captured amount, but it is possible to control by any other value irrespective of the amount (without considering the captured amount).

A motor 450 for winding the birdlime (or for optionally moving sensor) and a power supply 460 for supplying power are installed in the space under the birdlime. In addition, a controller 400, which comprises electronic devices performing functions of controlling the sensor and the motor and processing the detected signals, may be also installed under the birdlime.

If the sensor 370 for detecting insects is a point sensor (which can sense only one spot), then the controller receives an input value while controlling the motor moving the sensor at a constant speed. It then stores the input value for a vertical line (the intensity value) on the birdlime and calculates the speed control value of the cartridge by using this value. If the sensor is a line sensor (which can detect for a line), the controller 400 receives input values for one line at the same time and utilizes these values to control the speed of the birdlime cartridge. Similarly, if the sensor is a camera, then the controller 400 processes the images of the entire birdlime and utilizes the processed results to control the speed of the cartridge. The control value of the cartridge speed is a value that is continuously updated. It may be updated in the controller 400 and transmitted to the motor 350 so as to be used for the motor control.

The input value from the sensor is used to control the cartridge. At the same time, it is transmitted to the remote insect control monitoring system so that it may be used as data notifying the insect control status to a remote person observing the insect control status. For example, if the value input to a camera is transmitted to a monitoring system, the monitoring system may perform image processing and thus checks the type and number of the captured insects. On the contrary, it is also possible to perform such a processing in the controller 400 and transfer the results to a remote system. Such a monitoring system will be explained hereinafter.

According to another embodiment of the present invention, a sensor, which can sense environmental conditions such as temperature and humidity of a place where the capturing apparatus is installed, may additionally be mounted in the capturing apparatus. Since these environmental conditions may affect the frequency of insects' appearance or their activities, if the information on the change of the environmental conditions and for the captured amount is compared and analyzed together, it is possible to derive meaningful information with respect to the tendency of the insects and predict it. For example, if the amount of captured insects rapidly increases during a predetermined time, it is possible to find the causes of the insect increase by using the temperature and the humidity data of the place where the capturing apparatus is installed as a supplementary data during a predetermined period.

Also, it is possible to install a sensor detecting luminous intensity among the environmental conditions and to use this luminosity information for controlling the capturing lamp. If the capturing lamp is turned on in a room at nighttime, it has the effect of attracting flying insects into an inside of a building as well as capturing them. Therefore, when the luminous intensity around the capturing apparatus is sufficiently low, by turning off the UV light of the capturing apparatus, it is possible to prevent the insects from unnecessarily entering the building and to also mitigate power consumption.

As for the capturing lamp (UV light) installed in the capturing apparatus, the period of maintaining the effect of attracting insects is about 6 months. For most of the cases, before the 6 months lapse, the effect of the lamp substantially reduces. Although the capturing lamp is installed at the similar time, there is a large difference in the lifetime of the capturing lamp depending on the electrical status (the stability of the current and voltage) of the place where the capturing apparatus is installed. To solve this problem, a device that can measure the amount of the UV light, which is emitted from the capturing lamp, may be mounted to the inner part of the capturing apparatus cover. It is possible to maintain the attracting ability of the capturing lamp by continuously monitoring the amount of UV light, and notifying the exchange timing of the lamp if the measured amount is below a reference value.

The captured amount of flying insects in the capturing apparatus may be directly affected depending on whether the neighboring door is opened or not. Therefore, it is possible to precisely analyze the causes of the captured amount and to predict it by attaching a sensor for detecting opening of the windows or the doors around the space where the capturing apparatus is installed and then comparatively analyzing the data regarding the opening time of the windows, the doors and the like and the information of the captured amount of the capturing apparatus. The sensor for detecting the opening of the windows or doors may be implemented with various sensors, such as a simple mechanical sensor or a sensor having a light emitting part and a light receiving part. A processor for processing the output of the sensor may be installed at each door. Preferably, the output of the sensor as it is or after very simple processing may be transferred to the controller 400 within the capturing lamp. Then, the controller may process the output of the opening-detecting sensor so that it may convert the output into data showing the opening time or the opening status. The data for the status of the door etc. may be transmitted to a remote place together with the data for the captured amount and the environmental data. This is so that it may be utilized to analyze the insect control information and to establish the insect control plan.

The opening-detecting sensor may detect whether the door is open or to which degree the door is open. The size or positional information (in particular, the relative position to the capturing lamp) of the door may be stored in advance and may be used to analyze and to predict the captured amount together with the opening status and positional information.

Up to now, only the apparatus for attracting insects by using light such as UV light is disclosed. However, the other attracting means may further be provided in the capturing apparatus of the present invention in order to attract insects, which do not or less frequently respond to light.

It is known that a mosquito does not respond to light but to carbon dioxide. Thus, by coating TiO2, which generates small amounts of carbon dioxide if UV light reaches TiO2, on the inner surface of the capturing apparatus or the reflective surface of the cover, a mosquito as well as insects responding to UV light may be attracted when UV light is emitted from the capturing lamp. When TiO2 responds to UV light, it has various functions (e.g., emitting carbon dioxide, sterilization, deodorization, etc.), as well as being an appropriate material for coating the interior of the capturing apparatus since it can be coated on various materials. It is effective to coat the material on the part directly illuminated by UV light (e.g., the inner part of the cover front) within the capturing apparatus since TiO2 functions by UV light.

In addition, a device emitting other components, which can attract flying insects, may be separately installed within the capturing lamp. Various known materials such as pheromone may be used and injecting a little bit of these materials or distributing them through using a pan can supplement the attractive force.

As described above, in particular, the flying insects may be caught by using only the attracting means such as carbon dioxide and pheromone during the nighttime when the capturing lamp (UV light) is turned off.

Remote Monitoring System

Referring to the FIG. 9 through FIG. 24, the remote monitoring system will be explained which can monitor the activities of vermin from remote places using the capturing apparatus explained above. The capturing apparatus of FIG. 9 to FIG. 13 comprises the capturing apparatus of flying insects explained so far, but may include various other capturing apparatuses.

Figure 9:
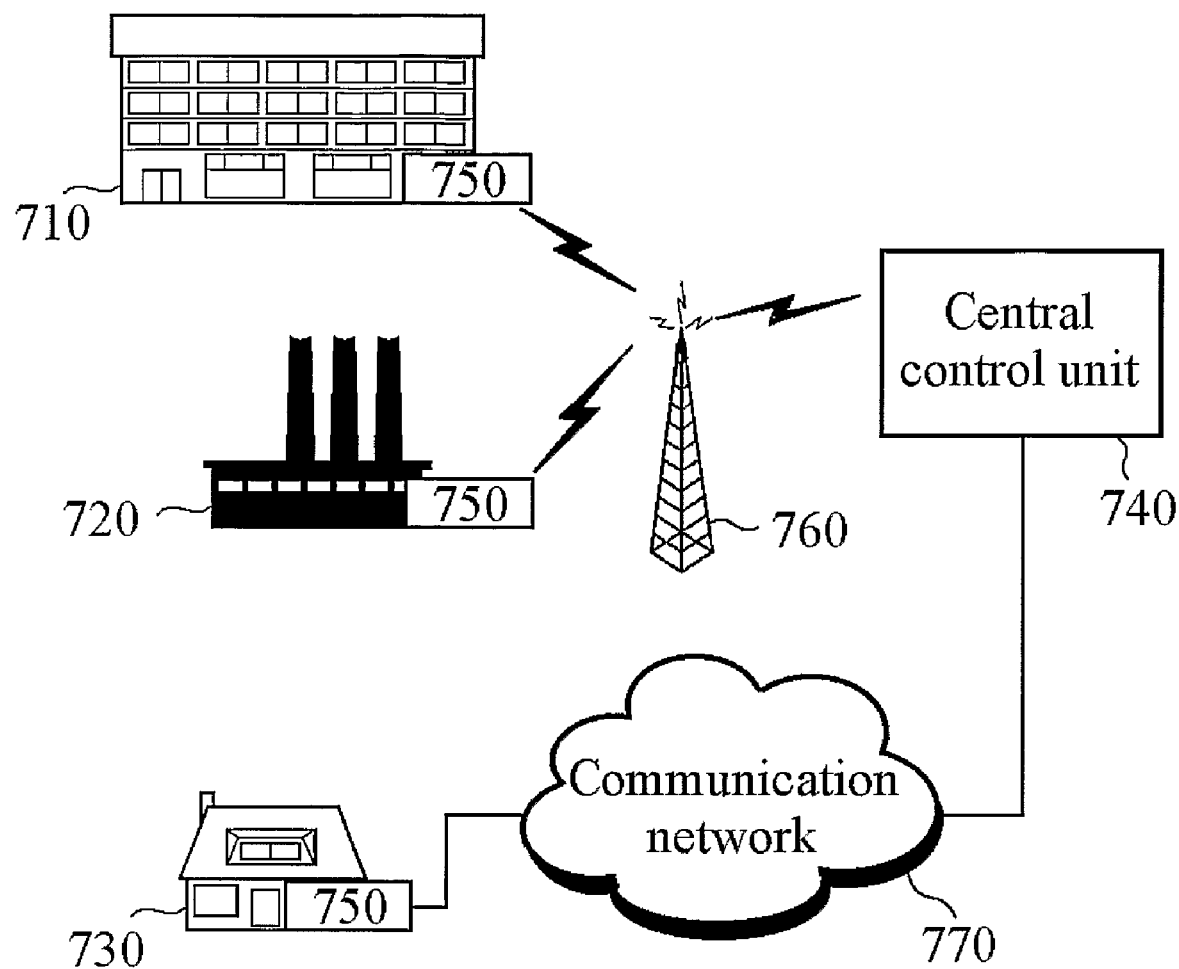
FIG. 9 is a schematic diagram of the entire system, to which the detection signal by the capturing apparatus having sensor in accordance with an embodiment of the present invention is transmitted.

FIG. 9 is a schematic diagram conceptually illustrating the remote monitoring system for insect control according to the first embodiment of the present invention.

As illustrated therein, the remote monitoring system for insect control according to the embodiment of the invention includes the remote control unit 750, which is installed in a monitored subject site such as a building 710, 720 and 730, to keep a watch on the activities of insects and to collect data on them. It then transmits the previously collected data through a wireless network 760 or wired network 770 such as Internet or general telephone lines. The remote monitoring system also includes the central control unit 740, which analyzes and manages the transmitted data. The monitored subject site means a building where insects appears or is likely to appear, or any other predetermined spaces (e.g., public parks, places for loading freights, etc.), or an outer area of the building or the predetermined space.

The remote control unit 750, which is installed in each building 710, 720 and 730, monitors the activities of insects and collects data such as the population of insects invaded or captured, the invasion time, the invasion route and the invasion location (hereinafter, "insect-related information").

The collected insect-related information is transmitted to the central control unit 740 in real time or periodically through the wireless communication network 760 or wired communication network 770. The communication network can be selected among a public switched telephone network, cables for high-speed Internet, and wireless local area network (LAN) according to the types and conditions of the sites 10, 12, and 14, in which the remote control unit 750 has been installed.

The central control unit 740 receives and analyzes the insect-related information transmitted from the remote control unit 750. Preferably, the insect-related information is analyzed to obtain information on, for example, the frequency of appearance and population of insect appearing or captured, based on predetermined analytic categories that are classified by buildings, positions in each building, times and dates, etc. Detailed descriptions on the analysis of the insect-related information will be made with reference to FIGS. 13 and 14. A insect control measure for each site is prepared based on the analyzed data in the central control unit 740. If it is decided that a insect control operation is required, then the service technician visits the subject site and performs the proper insect control operation based on the analyzed data.

The central control unit 740 generates secondary information, which is useful for insect control in, for example, appropriately determining a insect control time, by storing and updating the insect-related information in the database and analyzing it as needed. Hereinafter, the place at which the central control unit 740 is installed is called the "central control center."

Figure 10:
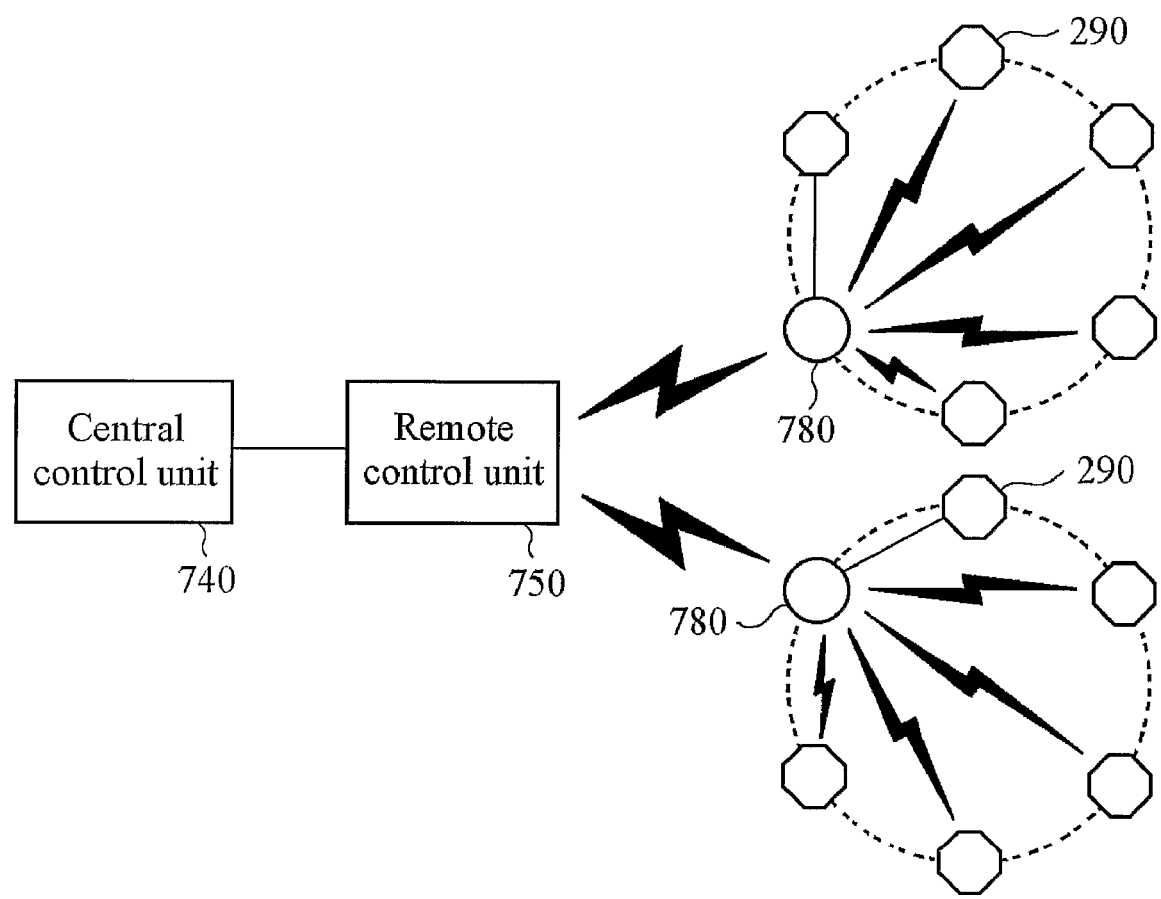
FIG. 10 is a schematic diagram showing the relationships among the capturing apparatus, repeaters, a remote control unit and a central control unit in accordance with an embodiment of the present invention.

The interrelationship between the capturing apparatus 290, repeaters 780, the remote control unit 750 and the central control unit 740 is illustrated in FIG. 10. The repeaters 780 are provided for effectively conducting wireless communications between the capturing apparatus 290 and the remote control unit 750. Remote control unit 750 is configured such that a single repeater 780 is coupled to one or more capturing apparatuses 290 and remote control unit 750 is coupled to one or more repeaters 780. However, capturing apparatus 290 does not have to be connected to the remote control unit 750 through repeaters 780 but can be directly connected to the central control unit 750. Additionally, in the figures, it is shown that each capturing apparatus communicates with the repeaters 780. As explained earlier, if the capturing apparatus 290 with the data processor is connected to several capturing apparatuses without the processor, then those apparatuses do not communicate directly with the repeaters 780, but communicate with repeaters 780 through the apparatuses 290 with the data processor.

Figure 11:
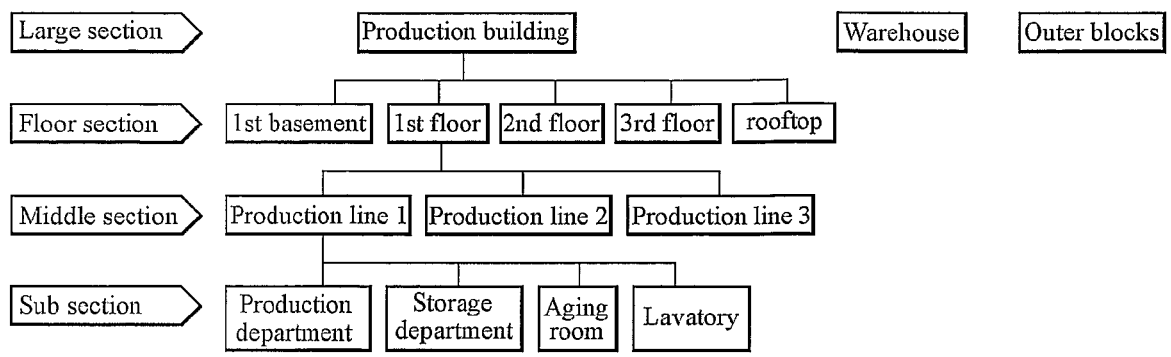
FIG. 11 is a diagram showing an example of sectioning in accordance with an embodiment of the present invention.

In the present invention, to manage the insect-related information efficiently, a subject site in a remote place is sectioned into a plurality of sections. Sectioning herein means to hierarchically divide a subject site (including a building) into a plurality of sections according to the characteristics of the area. In one embodiment of the present invention, a four-stage sectioning is applied to a subject site. In the embodiment, the four-stage sectioning divides a subject site (e.g., an industrial complex as a whole) into: a large section including buildings in the industrial complex and their outer blocks; a floor section including each floor in the buildings; a middle section under the floor section; and a sub-section that is under the area of the middle section. The sub-section is a minimum unit of sectioning. However, if additional sections in the industrial complex need to be monitored, then the sub-section may be further sectioned. For example, as shown in FIG. 11, production buildings, warehouses, and outer blocks in a factory belong to the large sections; floors of the production buildings, such as $1^{st}$ basement, $1^{st}$ floor, $2^{nd}$ floor, $3^{rd}$ floor, and rooftop, belong to the floor group; production lines 1, 2 and 3 on each floor belong to the middle section; and a production department, a storage department, an aging room, and a lavatory in each of the production lines belong to the small section. Those sections are the fundamental units (typically, sub-sections are the minimum units for insect control) for insect control and insect control measures, and are used for analysis and management of insect-related information. For example, analyzing the progress of insect outbreak and effectiveness of insect control is performed on each production line belonging to the middle section to produce the insect-related information. An appropriate insect control measure and control equipment are prepared for each production line by using the insect-related information when reforming or increasing the production lines.

A sub-section code is assigned to each sub-section. Each facility in a remote place is classified and the sub-section codes are assigned thereto based on the functions of sub-sections and/or tendency of the insect outbreak thereof. If sub-section codes of different sub-sections are identical to each other, then a similar tendency of insect outbreak would be expected in such sub-sections. For sub-section in different middle or large sections, identical district codes may be assigned since the sub-section codes are classified by the functions of sub-sections. For example, even if a computer room and an office room in an office building belong to different middle sections, identical sub-section codes may be assigned to them because they have similar characteristics in terms of insect control. Thus, the insect control can be performed in a similar way. Further, even if sub-sections are of identical types different sub-section codes may be assigned to them by taking into account their middle sections, floor sections, and large sections. For example, although kitchens in a house and large-scale restaurant belong to an identical type of sub-sections, different sub-section codes may be assigned since the characteristics of the house and the large-scale restaurant are different. By using the sub-section code, one can easily find and understand the characteristics and functions of the sub-sections of a subject site and quickly establish an appropriate insect control measure, even when the insect control subject site has a complex structure.

In the embodiment of the present invention, a subject site is sectioned based on physical units of the building (such as floors and productions lines), but the criteria for sectioning in the present invention is not limited thereto. For example, a middle section of a subject site may be classified based on whether a wired or wireless communication system is suitable for the section. A department store, for example, has a first space including shops where there are many obstacles to a wireless communication, such as partitions for separating shops from each other, as well as a second space including a swimming pool and exercising machines where there is no obstacle for communication. Here, the middle sections for the first and second spaces are determined by the type of communication. Then, with reference to the determined middle sections, sensors for wired communication may be installed in the first space and sensors for wireless communication may be installed in the second space. The service technician can systematically install sensors required for each sub-section of the subject site based on the determined middle section of the site.

Figure 12:
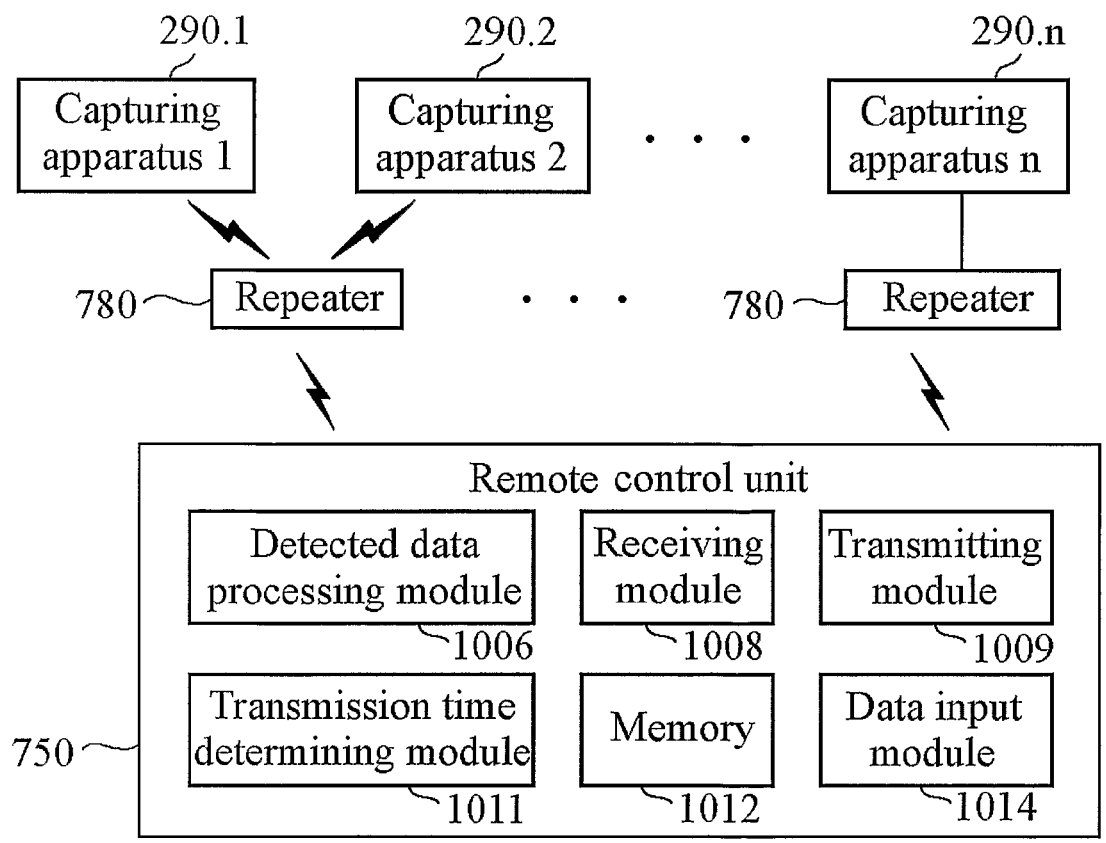
FIG. 12 is a block diagram showing a remote control unit included in a remote monitoring system of FIG. 9.

FIG. 12 shows a schematic block diagram of a remote control unit 750 in the remote monitoring system shown in FIG. 9.

As illustrated in FIG. 12, remote control unit capturing apparatuses 290, which are installed at predetermined positions of the subject site 710, 720, and 730, detect the movements of flying insects and provide detected data corresponding to the movements. The capturing apparatuses 290 are connected to the remote control unit 750 through repeaters. The remote control unit 750 receives detection signal from the capturing apparatuses 290, processes the received data and transmits the processed signals through wired or wireless communication network. In other words, remote control unit 750 collects multiple detection signal transmitted from multiple capturing apparatuses 290 and appropriately processes the detection signals. It then transmits the processed signals to the central control unit in remote places. In FIG. 12, a solid line between the nth capturing apparatus 290 and repeater 780 represents the wired communication and lightening symbols indicate the wireless communication.

Using Radio Frequency Identification (RF ID), repeaters can recognize multiple capturing apparatuses 290. In this case, the communication unit of the data processor of the capturing apparatus 290 has the transponder of RF ID and the repeaters 780 have the reader of RF ID. The reader of the RF ID can recognize a large number of transponders even at long distances. Accordingly, by installing capturing apparatus 290 anywhere in the subject site, the capturing apparatus 290 is automatically recognized by the repeaters 780. In case numerous capturing apparatuses 290 are connected to numerous repeaters 780 and one repeater 780 has too many capturing apparatuses 290 connected thereto, then such repeater will become overloaded. Accordingly, an equal amount of capturing apparatuses 290 should be connected to each repeater. Specifically, a predetermined number of capturing apparatuses 290, which could be connected to one repeater 780, is decided beforehand and capturing apparatuses 290 beyond that number should be connected to other repeaters 780.

When the capturing apparatus 290 is displaced or in cases of communication difficulties, the control unit of the data processor in the capturing apparatus 290 saves the capturing apparatus identification data and the information of detected insects (for example, the number captured on the birdlime per unit time) for a period of time in a ring buffer. It then transmits the saved data to repeaters 780 when the connection with repeaters 780 is resumed. In a structure where multiple capturing apparatuses are connected, as explained earlier, the controller with the processing ability is installed in only one capturing apparatuses. Thus, the controller saves the detection signal of other capturing apparatuses connected and transmits data to repeaters 780.

Real time transmission of detection signal from the capturing apparatus 290 to the repeaters 780 or remote control unit 750 is most preferable. However, the transmission of detection signal could be delayed if a plurality of the capturing apparatuses 290 attempt to transmit at the same time. In the embodiment of the present invention, each capturing apparatus 290 is prioritized to solve the problems caused by the delayed transmission of data. For example, if the capturing apparatus is installed in the restroom, the kitchen or the hall of a restaurant, then sanitation becomes the most important factor. Therefore, a priority is given to the kitchen, the hall and the restroom in that order. If the repeaters 780 conclude that the capturing apparatuses 290 in different places are sending the detection signal at the same time, then the repeaters receive the detection signal in the order of priority of the capturing apparatus 290 rather than receiving the data in the transmitted order. In the above example, the detection signal from the capturing apparatus 290 in the kitchen is received with first priority, followed by the detection signal from capturing apparatus 290 in the hall, and then followed by the signal from the restroom.

The locations for installing the capturing apparatuses 290 and the number of capturing apparatuses 290 are determined by the ecology of insects in the subject site, as well as by the environment and location of the specific building. Further, the location for installing capturing apparatus 290 and the number of capturing apparatuses 290 may be determined based on the sub-section code assigned to the sub-sections of the insect control subject site.

According to the present invention, through sectioning the subject site, it becomes easy to manage the positions of capturing apparatuses 290 installed in each sub-section, as well as to analyze, utilize and maintain the insect-related information produced by the capturing apparatuses 290. Without sectioning, the service technician must identify the position of each capturing apparatus 290 on a drawing of the subject site or show the positions in an absolute or relative coordinate system, which can be quite complex. In the remote monitoring system in accordance with one embodiment of the present invention, the positions of capturing apparatuses 290 installed in the subject site may be identified and used with ease and accuracy since the locations are stored in the central control unit 740 together with data on the sections. Precise location of the capturing apparatus 290 can be identified through RF ID using GPS. The locations of capturing apparatuses 290 can be identified with GPS and such location data can be sent to the central control unit 740. The location data of capturing apparatus 290 in the central control unit is sent to the service technician's portable communication terminals such as PDA. On the PDA of the service technician, the blueprint of the monitored subject site is displayed and saved in graphic file and the location of capturing apparatus is marked. Thus, the service technician can easily find the location of capturing apparatus 290. If capturing apparatuses 290 are not easily located, then the service technician cannot obtain accurate insect-related information. In addition, the birdlime not exchanged may be kept for a long time in the capturing apparatus so that it becomes a new habitat for the insects.

In addition, in one embodiment of the present invention, due to the sectioning, the locations and the number of capturing apparatuses 290 installed in each sub-section, as well as the insect-related information, may be managed in relation to the sectioning information. Thus, the insect-related information can be managed and analyzed per sub-section. Therefore, useful information that is effective for insect control in each sub-section can be derived from the insect-related information.

The capturing apparatus 290 provides the detected data by detecting insects with the sensor. The detected data are transmitted to remote control unit 750 together with identification signal unique to each capturing apparatus 290, the information of the captured amounts, the information related to replacement of the birdlime and time information through wired or wireless communication. As explained above, several capturing apparatuses are grouped and one of the multiple capturing apparatuses in the group has the controller 400, which can transmit data to remote control unit 750. In addition, even if there are several capturing apparatuses 290 with controller 400, each controller 400 can be connected in a master-slave manner. In this case, data processed by the controllers 400, which function as slaves under a master, is transmitted to remote control unit 750 through the master.

The detected data may be transmitted from capturing apparatus 290 to remote control unit 750 through repeaters 780. Especially, the repeaters are necessary if the monitored subject sites 710, 720 and 730 occupy a wide area or have a complex structure. The appropriate number of repeaters 780 is determined based on the dimension of the monitored subject sites 710, 720 and 730 and the number of the capturing apparatuses 290, etc. Generally, installation of the system is easy if transmission of data is done through wireless communication among capturing apparatuses 290, repeaters 780 and remote control units 750. However, depending on the structure and the internal configuration of the monitored subject sites 710, 720 and 730 and the arrangements of the furniture and facility units, it may be preferable to install communication lines between repeaters 780 and nth capturing apparatus 290 for cost reasons.

The remote control unit 750 stores and processes the detected data received from capturing apparatus 290 and transmits them to central control unit 740. The remote control unit 750 is installed at selected positions of each building 710, 720 and 730 and the location of installation is decided by considering the type of communication (i.e., wireless or wired communication), the type and condition of each monitored subject sites 710, 720 and 730 and the distribution of capturing apparatuses 290. This is so that secure communications are guaranteed and the units are not subject to mechanical damage or breakdown.

As illustrated in FIG. 12, the remote control unit 750 includes functional modules such as a detected data processing module 1006, a receiving module 1008, a transmitting module 1009, a transmission time determining module 1011, a memory 1012 and a data input module 1014. Functions of the modules will be briefly explained below.

The receiving module 1008 receives the detected data from capturing apparatus 290 or repeaters 780 and transfers them to detected data processing module 1006. The detected data processing module 1006 processes the detected data and collects insect-related information. The insect-related information includes, for example, types and population of invaded or captured insect, invasion time, invasion path, and invasion position. Various data can be generated depending on the types and arrangement of capturing apparatuses 290. The processed insect-related information is sent to transmitting module 1009 and transmitting module 1009 transmits the processed insect-related information to the central control unit 740. The transmission time determining module 1011 determines whether to transmit the insect-related information to central control unit 740 periodically or in real time. The memory 1012 is used to store the insect-related information of the subject site. The data input module 1014 is provided for the service technician to manually input other insect-related information that is not detected by capturing apparatuses 290. Also, it may be used to revise the errors in the data of the capturing apparatus 290.

Hereinafter, the detailed explanations of the remote control unit will be provided below.

The detected data processing module 1006 of the remote control unit 750 processes detected data transmitted from respective capturing apparatus 290.1, 290.2 and 290.$n$ based on the identification data of sensors and the time-stamp information that are transmitted together. The detected data processing module 1006 determines that sensor or controller of a specific capturing apparatus 290 has failed and generates failure signals indicating an abnormal status of the capturing apparatus 290 if detected data has not been received for a long time from the apparatus or the data over a predetermined range is received. The detected data processing module 1006 of the remote control unit 750 transforms the insect-related information into a format suitable for transmission to the central control unit 740. Also, the display such as LED can be installed in a capturing apparatus 290, which can indicate the status of the sensor and the controller of the capturing apparatus 290. Thus, it can indicate whether or not the capturing apparatus is broken by receiving failure signals from the detected data processing module 1006. The service technician does not have to disassemble a capturing apparatus 290 to find out whether the capturing apparatus 290 is broken. In addition, it is possible to display the exchange timing or the remaining length of the birdlime as described above.

The transmitting module 1009 of the remote control unit 750 transmits the insect-related information (including information related to the exchange timing of the birdlime) or the failure signals to the central control unit 740 through wireless network 760 or wired network 770.

The transmission time determining module 1011 of the remote control unit 750 determines whether data transmission from the remote control unit 750 to the central control unit 740 should be done periodically (for example, on a certain time in the middle of the night) or on a real time basis. The types of insect monitored, as well as the types and conditions of the communication network and/or power supply used by the remote control unit 750, should be considered in deciding whether to transmit data periodically or in real time. In case of using public switched telephone network for wired communication 400, the data may be transmitted to central control unit 740 at night to minimize the interruption of daytime calls. Nevertheless, transmission time determining module 1011 of the remote control unit 750 may be set to transmit data immediately when insects appear in abnormal frequency. If the insect-related information is transmitted periodically, the data is stored in the memory 1012 for a predetermined period. The insect-related information may be classified by time period (e.g., period between 0 and 8 hours, 8 and 16 hours, and 16 and 24 hours) to be separately stored in memory 1012.

The data input module 1014 of the remote control unit 750 may be used by the service technician or a user of the monitored subject site to input other insect-related information that are not easily collected through the capturing apparatus 290. For example, when insect control is performed based only on the insect-related information collected through capturing apparatuses 290, the data from places without capturing apparatuses 290 cannot be obtained. In addition, the reliability of the information could be affected by incorrect data that has accumulated due to minor operation failures. The data input module 1014 solves the above problem by allowing a service technician or a user of the monitored subject site to input supplementary information. The supplementary information, such as the data collected from capturing apparatuses 290, is transmitted to the central control unit 740 through the transmitting module 1009.

The above-described function modules 1006, 1008, 1009, 1012 and 1014 of the remote control unit 750 may be implemented with hardware specifically designed to perform the above-explained functions, or software modules programmed to perform the functions in general hardware.

Figures 13, 14:
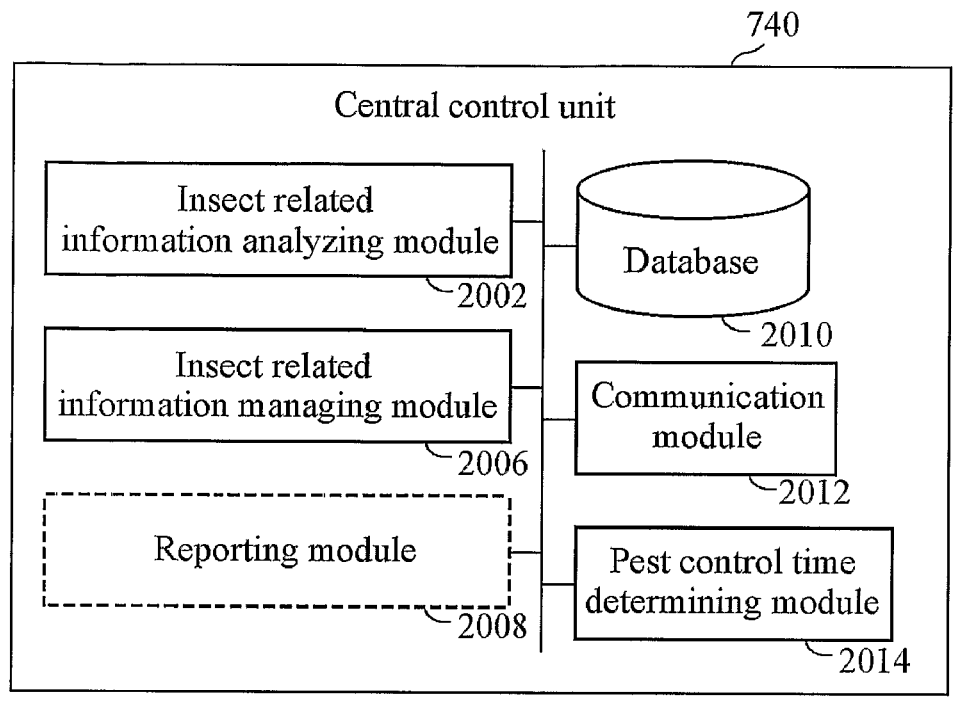
FIG. 13 is a block diagram showing a central control unit included in a remote monitoring system of FIG. 9.
FIG. 14 is a table showing the analysis of flying insects' activities in a sub-section.

FIG. 13 is a block diagram conceptually showing the configuration of central control unit, which is included in the remote monitoring system of FIG. 9.

As illustrated therein, the central control unit 200 comprises insect-related information analyzing module 2002, insect-related information managing module 2006, a database 2010, communication module 2012, and insect control time determining module 2014. The insect-related information analyzing module 2002 receives the insect-related information transmitted periodically or in real time from remote control unit 750 and analyzes it. The insect-related information managing module 2006 stores, updates and manages the insect-related information in database 2010. The communication module 2012 performs wired/wireless communications. The insect control time determining module 2014 determines the time when insect control needs to be performed. The central control unit 740 may further comprise report-preparing module 2008 for preparing a report periodically or as needed with regard to the insect-related information (the report preparing module 2008 is depicted with a dotted line in FIG. 13 and is an optional component).

The insect-related information analyzing module 2002 receives the insect-related information through the communication module 2012 and analyzes the data according to various categories. More specifically, insect-related information analyzing module 2002 analyzes the insect-related information to obtain data (e.g., frequency of occurrence or invasion, the number of appearance and invasion of insects, etc.) by various categories (e.g., building, locations at which capturing apparatuses 290 are installed in each sub-section of a sectioned site, date and time, types of insect and sub-section codes) or various other criteria used for performing insect control.

For instance, the insect-related information classified by the sub-section code can be used to prepare a insect control measure with respect to a monitored subject site as follows. If monitored subject sites were a plurality of large-scale supermarkets each having similar structure, then such supermarkets would be comprised of similar sub-sections. In this case, an appropriate insect control measure may be obtained by comparing, among the large-scale supermarkets, the insect-related information of sub-sections having identical sub-sections code. For example, a service technician utilizes a relative value of insect appearance frequency for a particular sub-section code, as well as an absolute value of insect appearance frequency in each large-scale supermarket, to establish a insect control measure. For example, in case where the insect-related information of store sub-sections in two large-scale supermarkets A and B are similar but insects appear more frequently in a warehouse sub-section of supermarket A than in that of supermarket B, the service technician determines that a insect generating factor exists in the warehouse of large-scale supermarket A rather than that of supermarket B so that an additional insect control measure is required for large-scale supermarket A.

Meanwhile, in one embodiment of the present invention, the insect-related information analyzing module 2002 decides the grade for each capturing apparatus 290 (preferably in real time) based on the number of insects detected by capturing apparatuses 290. For example, insect-related information analyzing module 2002 decides the grade of each capturing apparatus 290 as grade L1 when the number of detected insects is one to three, grade L2 when the number of detected insects is four to ten, and grade L3 when the number of detected insects is eleven to twenty. As the detected populations of insects increase, the grade of the capturing apparatus 290 also gets higher and after the insect control operation is performed, the grade of the capturing apparatus 290 is reset. Thus, the grade of each capturing apparatus 290 is useful for monitoring a status of insect appearance and determining whether or not an emergency insect control measure is required (detailed description will follow). In addition, the analyzed data from the insect-related information analyzing module 2002 may contain data such as previous history of insect appearance of each sub-section. With reference to historical data of insect, the service technician determines whether or not a new insect invasion path has appeared, and whether or not insect control chemicals are effective. Preferably, the categories used for analyzing the insect-related information are easily added or deleted, as needed.

The insect-related information managing module 2006 stores the insect-related information transmitted regularly or in real time from the remote control unit 750 in the database 2010. More specifically, the insect-related information managing module 2006 receives the insect-related information, which is newly transmitted from the remote control unit 750, and adds to or updates the existing data. Preferably, various analysis categories used by the insect-related information analyzing module 2002 are stored and managed in the database 2010.

The insect control time determining module 2014 determines whether the insect control is needed immediately based on the analyzed data of the insect-related information analyzing module 2002. The insect control time determining module 2014 notifies the service technician by alarm if the analyzed results of the insect-related information analyzing module 2002 are determined to be an emergency.

Referring to FIGS. 14 through 16, a specific example of how the insect control time determining module 2014 utilizes the analyzed results (hereinafter, "analysis result") from the insect-related information analyzing module 2002 will be explained below.

FIG. 14 is a table showing the analysis results of insects' activities in a sub-section.

Referring to the table in FIG. 16, the number of captured insects from each capturing apparatus 290 and grades assigned to each capturing apparatus 290 are shown as analysis results for each of the ten capturing apparatuses 290 installed in a sub-section. As seen from the table, the selected sub-section contains three L1-graded sensors (one to three insects detected) and one L2-graded sensor (four to ten insects detected). The analysis per each type of insect in each district is provided by insect-related information analyzing module 2002, preferably in real time.

Insect control time determining module 2014 determines the insect control time using the analysis results as follows:

FIG. 15 illustrates an example of a table used by the insect control time determining module 2013 for determining the time for insect control ("alarm table");

FIG. 15 is a table, which illustrates how the alarm type (i.e., alarms A, B or C) is determined according to the number of capturing apparatuses of grade L1 and L2. The alarm type represents the seriousness of insect appearance in the each sub-section. In the embodiment of the invention, alarm A indicates that the service technician has to carefully perform periodic insect control operation, while alarms B and C indicate that the service technician must perform insect control operation immediately. Alternatively, the service technician may perform the insect control operation immediately in case alarm C occurs or in case alarm B occurs over a predetermined number of times within a certain period.

The type of alarm is determined by considering the type of sub-section where insects appear, while alarm table may be changed depending on the characteristics of sub-section. The three tables shown in FIG. 15 are prepared to apply three different standards according to the type of sub-section. Table 1 of the alarm table in FIG. 15, for example, represents that alarm B applies if five to nine capturing apparatuses graded L1 are in the sub-section and alarm C applies if more than ten L1 or five L2 capturing apparatuses are in the sub-section.

In case there is one L1 grade capturing apparatus, alarm A applies according to table 1 of FIG. 15, whereas alarm B applies in table 3. Table 1 of FIG. 15 is applicable to the restroom or kitchen where the insect is likely to appear at various times. Table 3 is applicable to the sub-sections, such as guestrooms of a hotel or a hospital ward, where appearance of insect causes serious consequences.

FIG. 16 is an application table for deciding which alarm table to apply according to the sub-section code (i.e., characteristics of the sub-section). The application table may be updated by considering the status of the monitored subject site to see whether it is subject to intensive monitoring, unique characteristics of sub-section, etc.

Hereinafter, an example of analysis conducted by the insect-related information analyzing module 2002 based on the location and rate of insect invasion, etc., will be explained in detail. For purposes of illustration, a monitored subject is limited to guestroom No. 1003 and an accompanying restroom on the $10^{th}$ floor of hotel A. In this case, the hotel A is a large section, the $10^{th}$ floor is a floor section, Room No. 1003 is a middle section, and the guest room and the restroom belong to a sub-section.

When fourteen insects appear in the guestroom No. 1003, four out of ten capturing apparatuses 290, which are installed at hotel A/$10^{th}$ floor/Room 1003/guestroom, detect the insects and the insect-related information is transmitted to the central control unit. After that, the insect-related information is analyzed by the insect-related information analyzing module 2002 according to the locations where the insects appear and such analysis (shown in FIG. 21) is obtained for each capturing apparatus 290. In this case, the insect-related information analyzing module 2002 gives grade L1 to apparatus-1, apparatus-3 and apparatus-8, which detected 1 to 3 insects, and further gives grade L2 to apparatus-7 that detected 4 to 10 insects. With reference to the application table shown in FIG. 16, table 3 of FIG. 15 is applied to guestroom No. 1003. Since the number of apparatuses having grade L2 is 1, alarm C is notified, in which the service technician then performs an immediate insect control.

If the analysis result of FIG. 14 is for a case in which the insects appear in the restroom (and not in the guest room), then table 1 is applied (refer to the application table of FIG. 15) such that alarm A is notified unlike the case of the guest room. Alarm A represents that, instead of immediate insect control, the service technician can perform careful periodic insect control operation.

However, if the insects appear frequently in the restroom (even in small numbers), an immediate insect control is required even in the restroom. In this case, the insect control time determining module 2014 utilizes the analysis result classified by an appearance frequency. For example, the insect control time determining module 2014 may be set to notify alarm B if the number of L1-graded apparatus is over three in a week. Therefore, in addition to the alarm table of FIG. 15, the insect-related information may be applied to various other tables to prepare for insect activity. In addition, the service person (responsible for insect control) may know the exchange timing of the birdlime from the remote place and he can visit the site to exchange the birdlime on a necessary time.

Next, the communication module 2012 in the central control unit 740 performs wired/wireless communication with communication module 1008 of remote control unit. Since the technologies for the wired/wireless communications are well known, a description thereof will be omitted herein.

Referring to the FIGS. 17 and 18, the reporting module 2008, which is optionally included in the central control unit 740, will be explained in detail. FIGS. 17 and 18 illustrate an embodiment of the report prepared by the reporting module 2008 in the central control unit 740.

As illustrated in FIG. 17, the reporting module 2008 prepares a insect control report at a predetermined time of the day based on the analysis result of the insect-related information analyzing module 2002. The insect report may contain the population (number) of captured insect per time period (i.e., Period 1, Period 2, Period 3, etc.) and the building 710, 720 and 730, etc. The preparation of insect control report is facilitated by classifying the insect related information by periods and buildings, and also by storing the insect-related information in remote control unit 750 or central control unit 740. The active number of insects in each building 710, 720 and 730 is once again classified by the installed location of capturing apparatus 290 and the number of captured insects detected by the apparatus is classified by the type and then recorded.

FIG. 18 illustrates an embodiment of a report containing information with respect to sub-sections of the monitored subject site (hereinafter, "sub-section report"). It is a report regarding the production building shown in FIG. 11 where four-tier sectioning is used.

The sub-section report is pre-stored in the central control unit 740 so that the service technician may easily perform insect control operation for each sub-section of the monitored subject. After completing the insect control operation, the sub-section report may be updated. The sub-section report shown in FIG. 18 contains data fields such as the name of the sub-section, the description of location, the sub-section code, the name and quantity of installed equipment and whether the sub-section is vulnerable. Large, floor, middle and sub-sections are shown in the second and third rows of the sub-section report and a brief description for the location of each district is provided on the description of the location column. (The location data enables the service technician to easily find each sub-section). The sub-section codes corresponding to the sub-sections are provided in the sub-section code field. In this embodiment, an identical sub-section code is assigned to a production department and a storage department. Therefore, identical equipments are provided to both departments. The name and quantity of equipment installed in each sub-section are provided in the equipment/quantity field. The vulnerable section field is marked in case that the frequency of insect appearance is higher than the predetermined level, or a district is vulnerable to insect to other reasons. By examining this district report, the service technician can easily understand the structure of the monitored subject. Further, the service technician can easily understand the status of the insect by using the sub-section report together with the insect-related information. Therefore, by using this type of report, the service technician easily obtains the necessary information without relying upon individual memory or experience. Accordingly, even if the service technician for a specific monitored subject site is changed, insect control may be effectively performed. Further, insect control is effectively performed even if a person not assigned to a specific site is sent to the site, as long as the person has basic skills in insect control. The report in this specification includes a report in hardcopy format, as well as a screen-display, an electronic file and an e-mail format.

By using these reports, the insect-related information, which is obtained from the capturing apparatus 290 installed in each sub-section, is systemically transmitted to the service technician. The service technician then examines the insect-related information of each sub-section to perform insect control operation.

Preferably, the reports are prepared using the analysis result of insect-related information analyzing module 2002. Such reports can be made periodically or as needed. Also, the reports are stored for a certain period of time and are statistically re-analyzed according to predetermined categories. More specifically, by storing and examining short-term reports accumulated over a long time (e.g., a month, a season or a year) to observe changes over time, one can obtain the secondary data. For example, if insect-related information in a insect control monitored subject site shows having a similar trend for a long time and indicates a slight increase in insect appearance over a long period of time, then we can guess that a factor relating to insect appearance exists in the site and has not been treated. Further, by examining the reports over a long time, the effects of change of structure of the monitored subject site or change of chemical for insect control on the insect activity may be observed. The insect-related information, which is analyzed over a short term, can be sampled or averaged by a week or a month so as to be used in deciding a long term trend.

By analyzing the insect-related information according to predetermined categories, one may obtain data such as where to install chemicals for insect control and the amount of necessary chemicals. Such information can also be included in the report. In this case, the service technician can simply place the chemicals in the monitored subject site based on the report. This is so that the burden of checking the location or the amount of chemicals may be reduced. The locations and amount of the chemicals may be determined based on the insect-related information (or secondary data derived from the insect-related information) from capturing apparatus 290 by using a simple algebraic formula or by referencing a look-up table.

Further, in accordance with one embodiment of the present invention, the reports may contain activity information of insect, which is to be exterminated, at a position where a chemical is used (before and after installing the chemicals for exterminating the insect). The reports may be in the form of a graph where one can easily understand the trend. The reports are used to observe the effects of a chemical on a insect. In case there is no effect, the reports are used to determine whether the insects in the corresponding area have developed any tolerance to the chemicals used.

By using the sub-section report, the positions of capturing apparatus 290 and the insect control equipment installed in each district can be effectively managed. In the sub-section report, the type and quantity of the capturing apparatus installed in each sub-section are represented. During insect control, the service technician takes proper measures to check as many equipment in each sub-section as identified in the sub-section report, as well as to eliminate the captured insects and to check the functions of the equipment.

Figure 20:
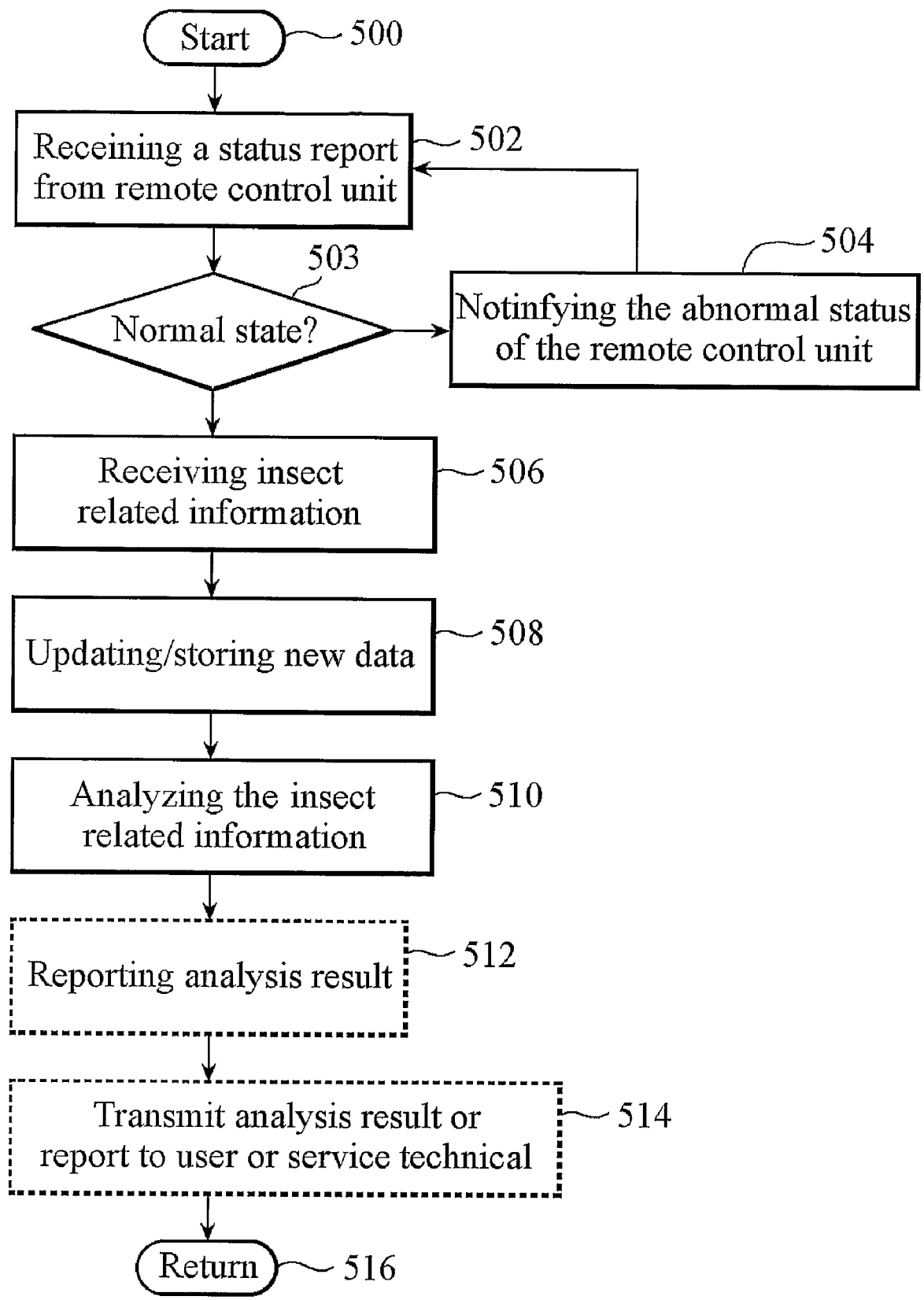
FIG. 20 is a flow chart showing major operations of a central control unit in the remote monitoring system in FIG. 9.

Referring to FIGS. 19 and 20, the operation of the remote monitoring system for insect control, which is in accordance with the embodiment of the present invention, will be explained below in detail.

First, the major operation of the remote control unit 750 will be explained in view of FIG. 19. FIG. 19 is a flow chart conceptually showing the major operations of the central control unit 750 in the remote monitoring system for insect control (shown in FIG. 9).

As illustrated therein, electrical power is applied in order to start the operation (step 600) and the components, such as remote control unit 750 and capturing apparatuses 290, are examined (steps 604 and 606). As a result, the status of the remote control unit 750 and the capturing apparatuses 290 are transmitted and reported to the central control unit 740 (step 608). Through such step of status reporting, the central control unit 740 becomes ready to communicate with the remote control unit 750. Preferably, step 608 is regularly performed to periodically check the status of the remote control unit 750 by the central control unit 740, as well as when the electrical power is applied.

Then, the remote control unit 750 receives the detected data (including the information of the captured amounts) from each capturing apparatuses 290 to collect the insect-related information (step 610). It then transmits the collected insect-related information to the central control unit 740 (step 612).

The control process of the above remote control unit 750 returns to an appropriate step among the previously explained. The above-mentioned steps do not have to be performed sequentially. Also, from power-on to power-off, all the steps do not have to be repeated the same number of times.

The major operations of the central control unit 740 will now be explained in view of FIG. 20. FIG. 20 is a flow chart conceptually showing the major movement of the remote monitoring system for insect control (shown in FIG. 9).

As illustrated therein, electrical power is applied in order to start the operation in step 500. The central control unit 740 receives a status report from the remote control unit 750, which represents whether or not the remote control unit 750 and capturing apparatus 290 are in a normal state (step 502) (for example, whether the sensor receives an input well, or whether the birdlime remains or not, etc.). If it is confirmed that the components of the remote control unit 750 are in the normal state, then next steps are performed. However, if the conditions of the capturing apparatus 290 of the remote control unit 750 or the remote control unit 750 are determined to be abnormal, then such information is notified to the service technician (step 204). The service technician, for instance, should immediately repair the apparatus if the capturing apparatus 290 in important sections, such as a hotel or a guestroom, is out of order. The failed capturing apparatuses 290 in sections, such as restrooms, can be repaired during regular check-ups. To obtain reliable response, the remote control unit 750 may report the failure of capturing apparatuses 290 to the service technician after receiving a failure response of the apparatuses (e.g., three times).

Next, the central control unit 740 receives the insect-related information transmitted from the remote control unit 750 (step 506). To receive the insect-related information reliably, the communication module 2012 has to be examined first. Such a step is well known to a person of ordinary skill in the art. Therefore, the detailed descriptions will be omitted herein.

After the above, the central control unit 740 performs database management operation by comparing the received insect-related information with the pre-stored data in the database 2010. It then updates or stores the new data as needed (step 508).

Subsequently, the central control unit 740 analyzes the insect-related information stored or updated in the database 2010 based on predetermined categories for analysis (step 510). Preferably, analysis of the insect-related information is performed to find information such as the frequency of appearance or invasion, the number of appearing or invading insects and the captured amounts based on various categories (e.g., each building where remote monitoring apparatus 100 are installed, the positions of capturing apparatus 290 in each building or specific times of the day.

Optionally, the central control unit 200 may produce a report containing the analysis result of the insect-related information (step 512). The details of the report will be omitted herein since it has already been explained in view of FIGS. 17 and 18. The central control unit 200 transmits the analysis result or the report to a user or a service technician of each site 710, 720 and 730 (step 514). Step 514 is also an optional step.

After the above, control process of the central control unit 740 is returned to an appropriate step among the previously explained steps.

The above steps do not need to be performed sequentially or repeated the same number of times from power-on to power-off.

The following describes a remote monitoring system of another embodiment of the present invention.

Figure 21:
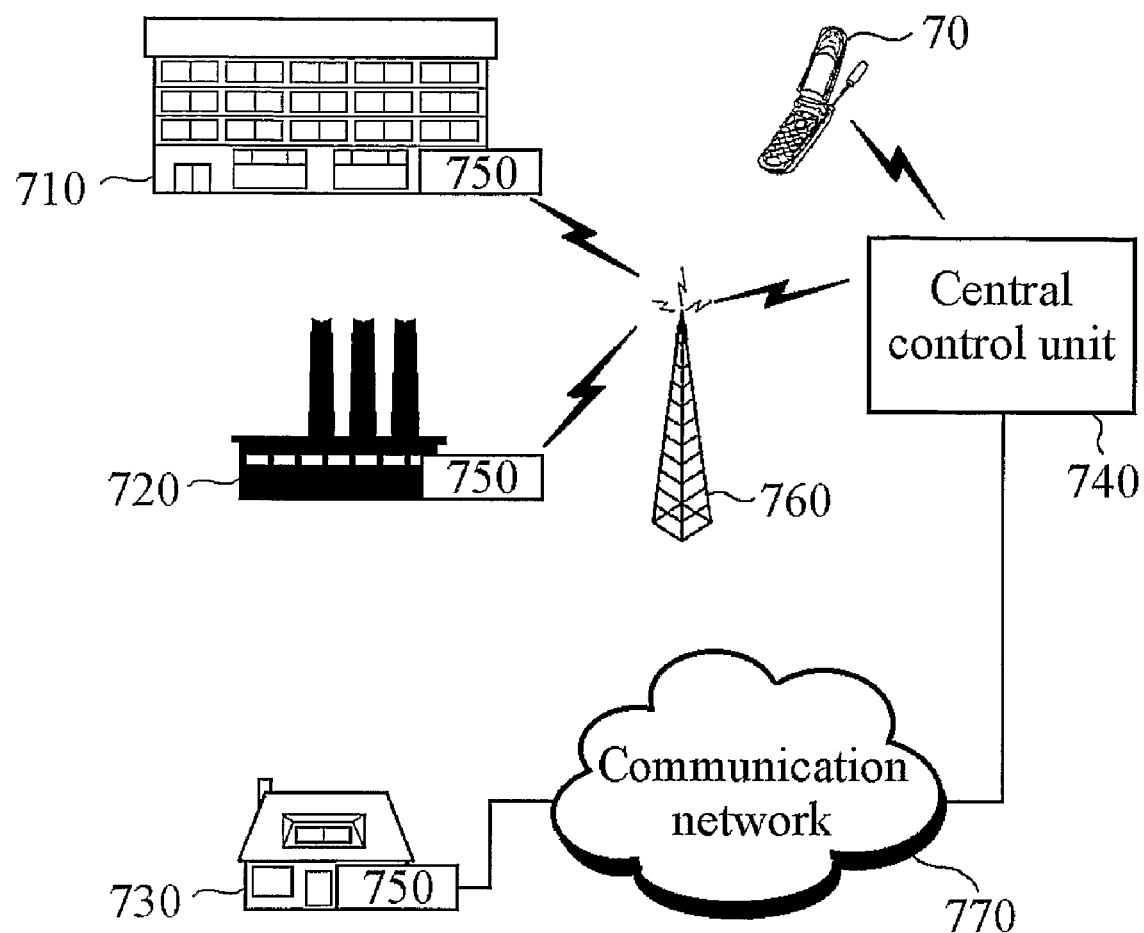
FIG. 21 is a schematic diagram of the remote monitoring system in accordance with a second embodiment of the present invention.

FIG. 21 is a diagram chart conceptually showing the remote monitoring system for insect control according to the second embodiment.

The difference between the first and second embodiments of the remote monitoring system of the present invention is that the central control unit 740 re-transmits the analysis result of the insect-related information to users of each building 710, 720 and 730 and/or to the service technician. More specifically, the service technician receives the analysis result of the insect-related information by using mobile communication terminal 70, such as a personal digital assistant (PDA) or a mobile phone, and performs insect control operation that is suitable for each monitored subject site.

Figure 22:
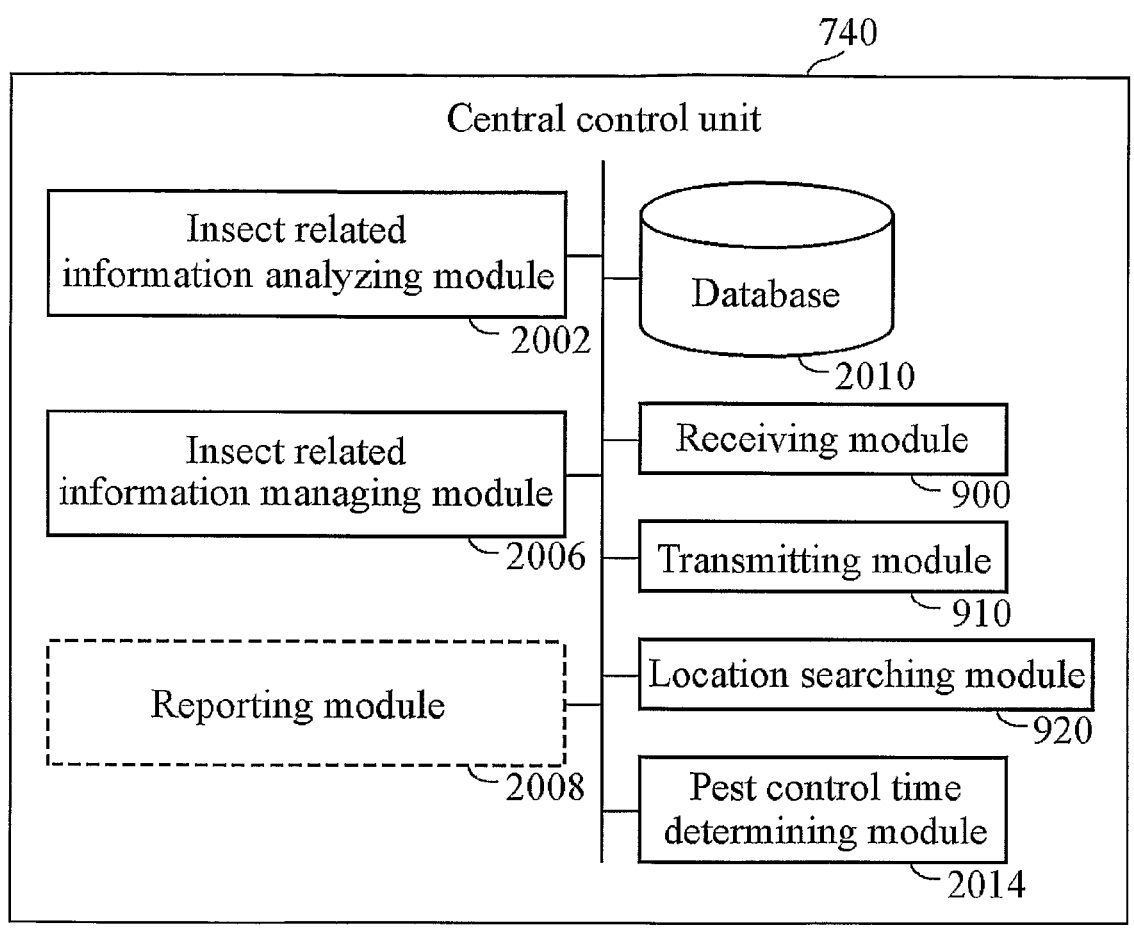
FIG. 22 is a schematic diagram of the central control unit in accordance with a second embodiment of the present invention.

FIG. 22 is a block diagram showing the central control unit 740 according to the second embodiment of the present invention.

The second embodiment comprises a receiving module 900 and a transmitting module 910 instead of the communication module of the first embodiment. Also, the central control unit 740 may optionally include a location searching module 920.

In the second embodiment, the receiving module 900 receives insect-related information from the remote control unit 750 and transmits the data to insect-related information analyzing module 2002. An analysis result is transmitted from insect-related information analyzing module 2002 to mobile communication terminal 70 of the service technician through transmitting module 910 of central control unit 740. The insect-related information is transmitted to the service technician periodically, or in response to the service technician's demand, or according to other predetermined transmission protocols. For example, in case the service technician is scheduled to visit a subject site, the insect-related information of the subject sites to be visited on a particular day is transmitted to mobile communication terminal 70 of the service technician on the basis of the visiting schedule. In this embodiment, in cases of an emergency situation in a subject site, central control unit 740 searches the locations of service technicians possessing mobile communication terminal 70 through the location searching module 920 and transmits insect-related information to the service technician located nearest to that building where emergency happened. The location searching module 920 may receive location information of mobile communication terminal 70 (whenever necessary) through communication providers.

In addition, by using mobile communication terminal 70 and location searching module 920, the paths or movements of service technicians may be effectively managed. For example, since central control unit 740 detects the location of each service technician through mobile communication terminal 70, the order of visits for insect control may be effectively determined. If the workflow of insect control is determined so that the technician can first take care of the closest site, the time required to travel to the sites can be reduced, thus increasing the efficiency of insect control operation.

In accordance with the second embodiment of the present invention, the length of time from when the emergency occurs to when the insect control is performed may be shortened. Generally, central control unit 740 is connected to a plurality of remote monitoring apparatuses 100 through wired or wireless communications. Thus, some remote monitoring apparatuses 100 may be located somewhat far from the central control unit 740. If the service technician at the central control center receives an analysis of insect-related information from central control unit 740 and then goes to a remote insect control subject site, it requires much time. According to the second embodiment of the present invention, the analysis result is automatically transmitted to a service technician nearest to the site where many insects appeared (meaning emergency). This is so that the service technician can immediately exterminate the insects. Since the service technician can check other insect-related information on the way to the subject site, he/she may perform a regular examination and other insect control operation when exterminating the insects.

Figure 23:
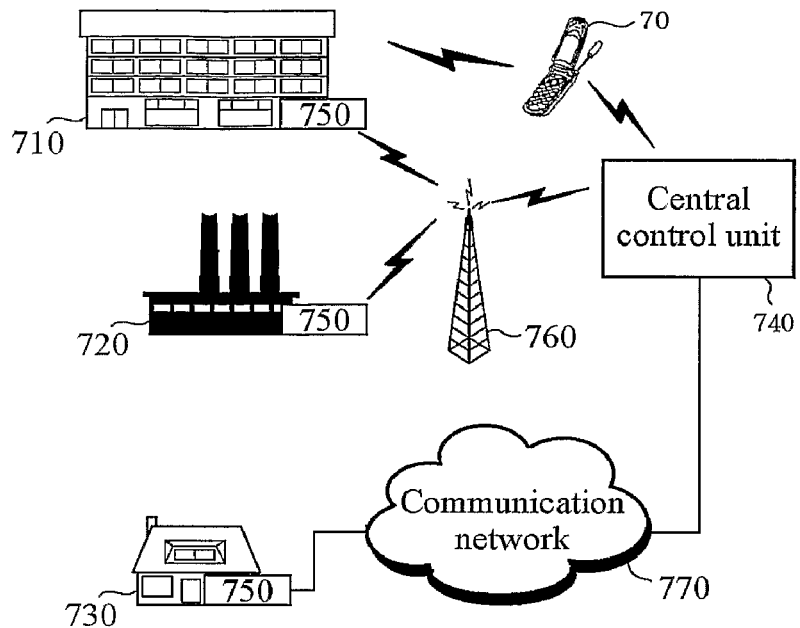
FIG. 23 is a schematic diagram of the remote monitoring system in accordance with a third embodiment of the present invention.

FIG. 23 is a block diagram conceptually showing the third embodiment of the remote monitoring system.

The difference between the second and third embodiments of the present invention is that insect-related information may be directly transmitted from remote control unit 750 to mobile communication terminal 70 in the third embodiment. Although mobile communication terminal 70 shown in FIG. 23 communicates with remote control unit 750 by wireless communication, mobile communication terminal 70 can also be configured to communicate with the remote control unit 750 via both wired and wireless communications. In the third embodiment of the present invention, the service technician may receive an instruction to move to a subject site from the remote control unit 750, which is installed at the site, or from the central control unit 740. He/she can also receive insect-related information from both.

Figure 24:
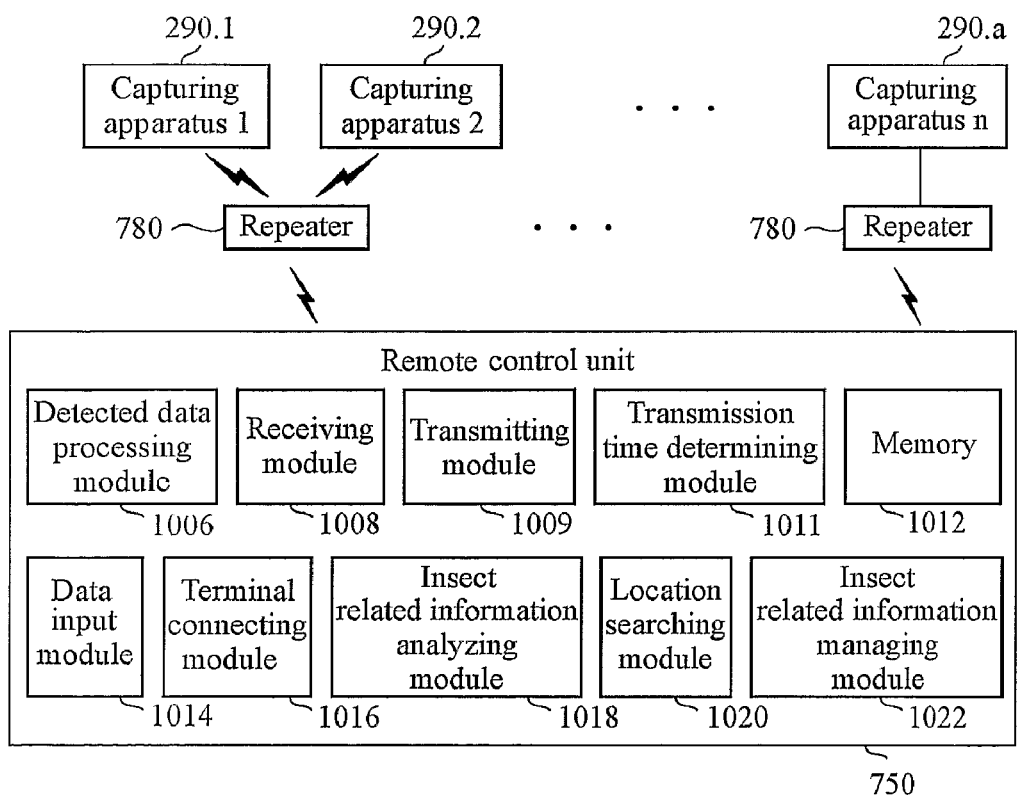
FIG. 24 is a block diagram showing the remote control unit of the remote monitoring system in FIG. 23.

FIG. 24 is a block diagram conceptually showing the remote control unit 750 according to the third embodiment.

Compared to the first embodiment, the remote control unit 750 of the third embodiment further includes a insect-related information analyzing module 1018, a insect-related information managing module 1022, and a terminal connecting module 1016. Also, a location searching module 1020 may be optionally added to remote control unit 750.

The location searching module 1020 installed in the remote control unit 750 searches the location of the mobile communication terminal 70. The detailed analysis of information is performed in insect-related information analyzing module 1018 in remote control unit. The procedure for analyzing information in the insect-related information analyzing module 1018 is identical to that of the central control unit 740. An analysis is stored in memory 1012 by the insect-related information managing module 1022. A service technician receives an instruction to go to a subject site through mobile communication terminal 70. At the site, the service technician then connects the mobile communication terminal 70 to the terminal connecting module 1016 of the remote control unit 750 by wired/wireless communication. When the mobile communication terminal 70 is connected to the terminal connecting module 1016, the terminal connecting module 1016 retrieves the analysis result of the insect-related information stored in the memory 1012 and transmits the same to the mobile communication terminal 70. The service technician performs insect control on the basis of the analysis result received through mobile communication terminal 70. In accordance with the third embodiment of the present invention, the remote control unit 750 may comprise a reporting module (not shown) so as to transmit a report, which is produced by the reporting module, to the mobile communication terminal 70 through the terminal connecting module 1016. For example, after checking the report, which includes the information on sections of a site through the display of mobile communication terminal 70, the service technician performs insect control suitable for the structure of the site.

In the third embodiment of the present invention, most of the data is directly transmitted from the remote control unit 750 to the mobile communication terminal 70 without using a commercial wireless communication service. As a result, the costs for wireless communication may be reduced.

Similar to the second embodiment, the location searching module 1020 may be employed in the third embodiment of the present invention for searching the location of a service technician nearest to the subject site. Further, when an emergency occurs, an instruction to move to a subject site is directly transmitted from the remote control unit 750 to the mobile communication terminal 70 of a service technician, who is closest to the subject site.

The procedures of insect control will be explained by using the above-explained remote monitoring system of the present invention.

When alarm C is issued for a monitored subject site in the central control center, the service technician refers to the report in order to understand the environment of the building that is in need of insect control. The service technician sends the departure signal to the remote control unit by using a PDA before going to the monitored subject site. When arriving at the subject site, he/she connects the PDA to the terminal connecting module of the remote control unit to receive the insect-related information regarding any changes in the circumstances. The arriving time at the monitored subject site is transmitted to the remote control unit and the central control unit. The service technician performs the work by conversing with the user of the monitored subject about the problems and receives additional demands from the user, which are transmitted to the central control unit through PDA. The service technician performs the capturing apparatus check-up, the replacement of birdlime, the chemical treatment, etc. After everything is done, the capturing apparatus is reset so that the counted population of the insects is set to zero. When everything is done, he/she connects his/her PDA to the terminal connecting module of the remote control unit in order to confirm the situation. The day's work is done when the service technician explains the situation to the user of the building using the PDA. The service technician, who is done with the insect control, moves to another monitored subject site according to the instructions from the central control center. In order to move quickly to the subject site, a relatively short route to the monitored subject should be selected by using the data received by the PDA from the center.

Although the analysis of the insect-related information is performed in remote control unit 750 in the embodiment explained above, the mobile communication terminal 70 can be configured to analyze the insect-related information by adding a program or separating hardware to mobile communication terminal 70. That is, the mobile communication terminal 70 may comprise an insect-related information analyzing module. The procedure to be performed in the mobile communication terminal 70 is similar to that of the central control unit 200.

According to the second and third embodiments of the present invention, a service technician, who is closest to a monitored subject site, may perform insect control. Conventionally, each service technician is assigned to a corresponding monitored subject site so that only the assigned service technician performs an insect control in the corresponding monitored subject site. As a result, if the service technician for a specific monitored subject site is switched or replaced, effective insect control on that site becomes difficult since a new service technician has no systematic data on the subject site. However, in the second and third embodiments of the present invention, service technicians obtain analyzed insect-related information on a monitored subject site from the central control unit 200 or remote monitoring apparatus 100 while moving to the subject site. This is so that any service technicians may effectively perform insect control.

INDUSTRIAL APPLICABILITY

As described above, the following effects are produced through implementing the present invention.

First, many insects are attracted to the capturing apparatus. Thus, the apparatus can exterminate many insects. In addition, the captured insects can be considered to derive statistically accurate information about the overall insects in the monitored section, thereby enabling more accurate analysis.

Second, with the sensor provided in the capturing apparatus, the service technician can become aware of whether insects are captured or not, the amount of captured insects, and whether the birdlime needs to be replaced in remote places without the need to visit the site of installation. Thus, the work efficiency can be increased since the service technicians only need to visit the site when the insects are increased abnormally or when the birdlime needs to be replaced.

While the present invention has been shown and described with respect to the particular embodiments, those skilled in the art will recognize that many changes and modifications may be made without departing from the scope of the invention as defined in the appended claims.

The invention claimed is:

1. A capturing apparatus for capturing flying insects, comprising:
 a UV light;
 a birdlime cartridge;
 a birdlime configured to be wound to the birdlime cartridge; and
 a winding means configured to wind the birdlime at a variable speed
 a camera to provide image signal data of a surface of the birdlime;

a controller to control a speed of the winding means based on the image signal data of the camera; and a monitoring system to inform a controlling condition of the flying insects by sending the image signal data of the camera to a system located in a remote place.

2. The capturing apparatus according to claim 1, wherein the camera senses an intensity of the surface image of the birdlime on which the flying insects are captured, and the controller controls the winding means to wind the birdlime faster or slower according to an amount of the captured flying insects based on the intensity.

3. The capturing apparatus according to claim 1 further comprising a display means for displaying information related to a replacement timing of the birdlime.

4. The capturing apparatus according to claim 1 further comprising a means for determining a replacement timing of the birdlime.

5. The capturing apparatus according to claim 4 wherein the means for deciding the replacement timing of the birdlime comprises a means for deciding a wound length or a remaining length of the birdlime.

6. The capturing apparatus according to claim 1 wherein said capturing apparatus is enclosed by a cover, wherein a part of the cover is fabricated from a transparent material.

7. The capturing apparatus according to claim 6 wherein another part of the cover is generally directed downward when the capturing apparatus is installed, said another part of the cover being fabricated from an opaque material.

* * * * *

UNITED STATES PATENT AND TRADEMARK OFFICE
CERTIFICATE OF CORRECTION

PATENT NO.        : 7,401,436 B2
APPLICATION NO. : 10/590837
DATED             : July 22, 2008
INVENTOR(S)       : Chan H. Chyun Page 1 of 1

It is certified that error appears in the above-identified patent and that said Letters Patent is hereby corrected as shown below:

Title Page:

Item (75), Inventor: "Songpa-gu" should be -- Seoul --.

Signed and Sealed this

Twenty-fourth Day of March, 2009

JOHN DOLL
*Acting Director of the United States Patent and Trademark Office*